United States Patent [19]

Sato et al.

[11] 3,916,122

[45] Oct. 28, 1975

[54] AUDIO OR ACOUSTIC APPARATUS COMPRISING A RADIO PORTION AND A TAPE RECORDER PORTION

[75] Inventors: Masaaki Sato; Ken Satoh, both of Hachioji, Japan

[73] Assignee: Olympus Optical Company Ltd., Tokyo, Japan

[22] Filed: May 23, 1974

[21] Appl. No.: 472,883

[30] Foreign Application Priority Data

May 24, 1973 Japan ........ 48-58129
Sept. 21, 1973 Japan ........ 48-105983
May 18, 1974 Japan ........ 49-55001

[52] U.S. Cl. ........ 179/100.11; 360/137
[51] Int. Cl.² ........ G11B 31/00
[58] Field of Search ........ 179/100.11; 360/137

[56] References Cited

UNITED STATES PATENTS

| | | | |
|---|---|---|---|
| 3,505,486 | 4/1970 | Lear et al. | 179/100.11 |
| 3,521,010 | 7/1970 | Sato | 360/137 |
| 3,536,859 | 10/1970 | Tolar | 179/100.11 |
| 3,632,901 | 1/1972 | Wally | 179/100.11 |
| 3,843,847 | 10/1974 | Sato | 179/100.11 |

*Primary Examiner*—Vincent P. Canney
*Attorney, Agent, or Firm*—Waters, Schwartz & Nissen

[57] ABSTRACT

An audio or acoustic apparatus comprises a radio portion which includes a tuning circuit, an amplifying circuit, a loudspeaker system and an electric power source, a tape recorder portion which includes a magnetic tape cassette receiving portion, a tape driving means, a recording and play-back operating means, at least one magnetic head, an amplifying circuit and an electric power source, said radio and tape recorder portions being able to be mechanically and electrically coupled or decoupled to or from each other at a side wall of the radio portion and a side or rear wall of the tape recorder portion. The audio apparatus further comprises a mechanically coupling means for detachably coupling said radio and tape recorder portion in a positive and simple manner and an electrically coupling means for transmitting electrical signals from the radio portion to the tape recorder portion or from the tape recorder portion to the radio portion, and a switching circuit installed in the radio portion for controlling the transmission of the signals.

34 Claims, 20 Drawing Figures

AUDIO OR ACOUSTIC APPARATUS COMPRISING A RADIO PORTION AND A TAPE RECORDER PORTION

The invention relates to an audio or acoustic apparatus comprising a radio portion and a tape recorder portion, these portions being detachably coupled to each other.

During recent several years a cassette type tape recorder having a radio receiver installed therein has been widely developed. In such a tape recorder including the radio receiver comprises generally a radio tuner portion, a tape recorder portion, a loud speaker portion, an amplifier portion and a voltage source. This type of tape recorder is suitable for various uses. However since all of the above portions are accommodated in a single housing, it cannot be avoided that size and weight become greater. Therefore known tape recorders of the above kind are not suitable for being carrier with users.

For instance in case of recording sounds with carrying the tape recorder, only the tape recorder portion is essentially used, but a user has to carry all of the remaining portions which need not be used in this mode of recording operation. This is quite inconvenient for the user. The more functions are added to the tape recorder, the greater such an inconvenience will become.

It has been known to connect various audio components by means of connecting codes or wires so as to effect transmission of signals between these components. However labor work of connecting many terminals of the various components by means of many connecting codes is quite troublesome for the user. Moreover, it is almost impossible to carry all of the components.

The present invention has for its object to provide a novel audio apparatus comprising the radio portion and the tape recorder portion, in which these portions can be electrically and mechanically coupled or decoupled to or from each other at will, so that either one of them can be carried by the user, and further the radio and tape recorder portions can be used as ordinary radio receiver and tape recorder, respectively, both in the separated and combined forms.

It is another object of the invention to provide an audio apparatus comprising a radio portion and a tape recorder portion, in which these portions can be electrically and mechanically coupled or decoupled to or from each other, in the coupled form, the tape recorder portion can be energized by a voltage source provided in the radio portion, which voltage source usually has a large capacity so as to prolong a life time of a battery of the tape recorder portion.

It is further object of the invention to provide an audio apparatus comprising a radio portion and a tape recorder portion, in which these portions can be electrically an mechanically coupled or decoupled to or from each other, in the coupled form the radio portion can be energized only by actuating operation members of the tape recorder portion.

It is still another object of the invention to provide an audio apparatus of the kind mentioned above, in which the adjustment of the recording and reproducing levels of the tape recorder portion can be easily and positively effected with monitoring a level meter provided in the radio portion.

It is still another object of the invention to provide an audio apparatus of the above mentioned kind, in which an AGC circuit of the tape recorder portion can be switched on or off in dependence on the operation modes of the apparatus.

It is still another object of the invention to provide an audio apparatus of the above kind, in which the radio portion and the tape recorder portion can be electrically and mechanically coupled or decoupled to or from each other in a simple manner, particularly with a single operation.

According to a basic aspect of the present invention an audio apparatus comprises a radio portion, a tape recorder portion, means for electrically coupling said radio and tape recorder portions and means for mechanically coupling said radio and tape recorder portions, whereby both in separated and combined modes of operation said radio and tape recorder portions can be used as ordinary radio receiver and tape recorder, respectively and in a combined mode of operation radio program signals received by said radio portion can be recorded by the tape recorder portion and signals produced by the tape recorder portion can be reproduced by a loudspeaker system provided in a radio portion.

According to the audio apparatus of the invention, it is sufficient for the user to carry with him only the tape recorder portion in case of recording sounds through a microphone and size and weight of this tape recorder portion can be made very small and light. Moreover in case of playback operation use can be made of the loudspeaker system of the radio portion, which loudspeaker system may be of a high quality. Thus in some cases a loudspeaker of the tape recorder portion could be deleted. In this case the tape recorder portion can be further made small and light.

The applicant has developed a miniature cassette type tape recorder which may be handled by a single hand of the user. Such a miniature tape recorder may be preferably utilized as the tape recorder portion of the audio apparatus according to the invention.

Now the present invention will be explained in greater detail with reference to the accompanying drawings.

FIGS. 1 to 12 shows a first embodiment of the audio apparatus according to the invention, FIG. 1 is a perspective view of the audio apparatus according to the invention composed of a radio portion and a tape recorder portion in the separated form, FIG. 2 is also a perspective view showing more clearly constructions of the side wall of the radio portion and the rear wall of a tape recorder portion, which walls are mechanically and electrically connected to each other;

Figure 2:
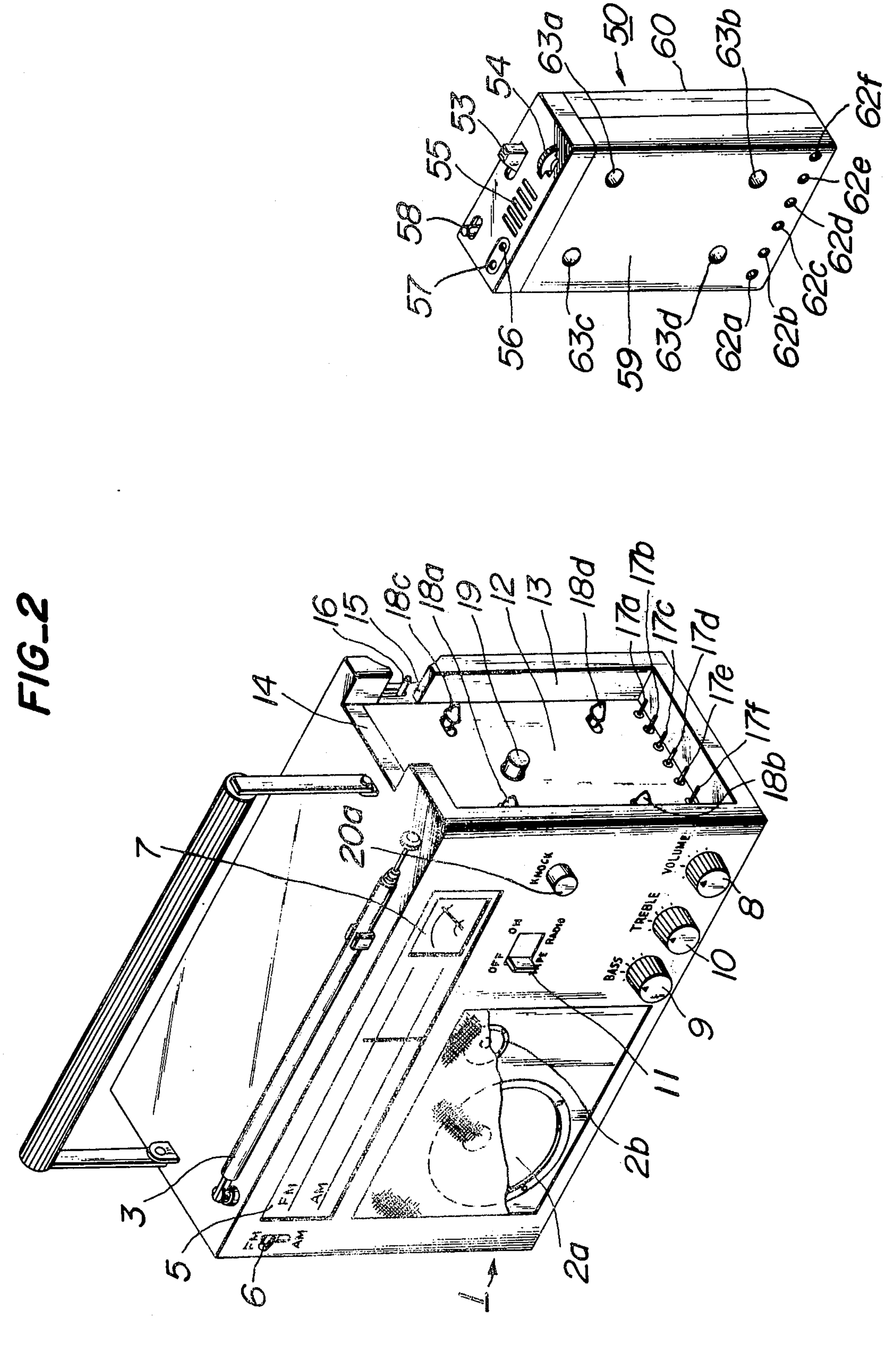
Figure 5:
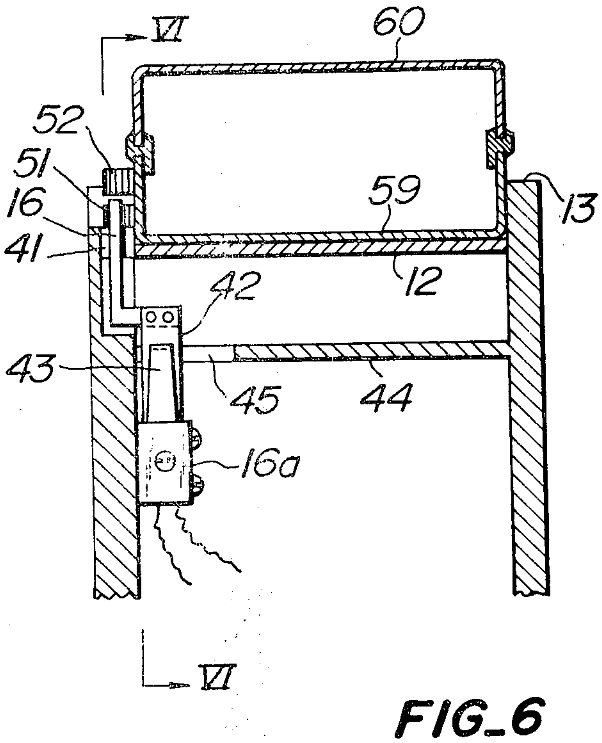
Figure 6:
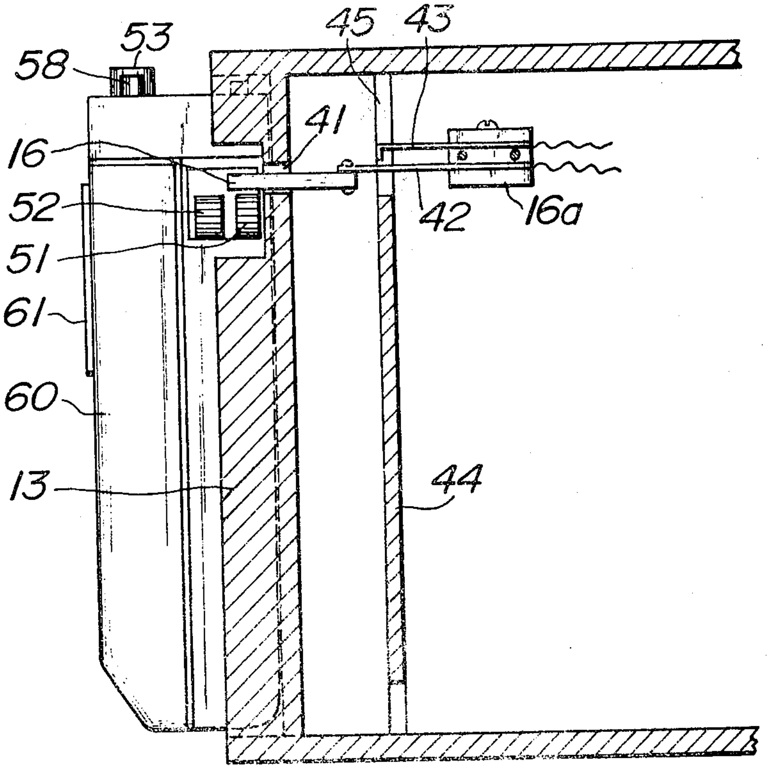
Figure 7:
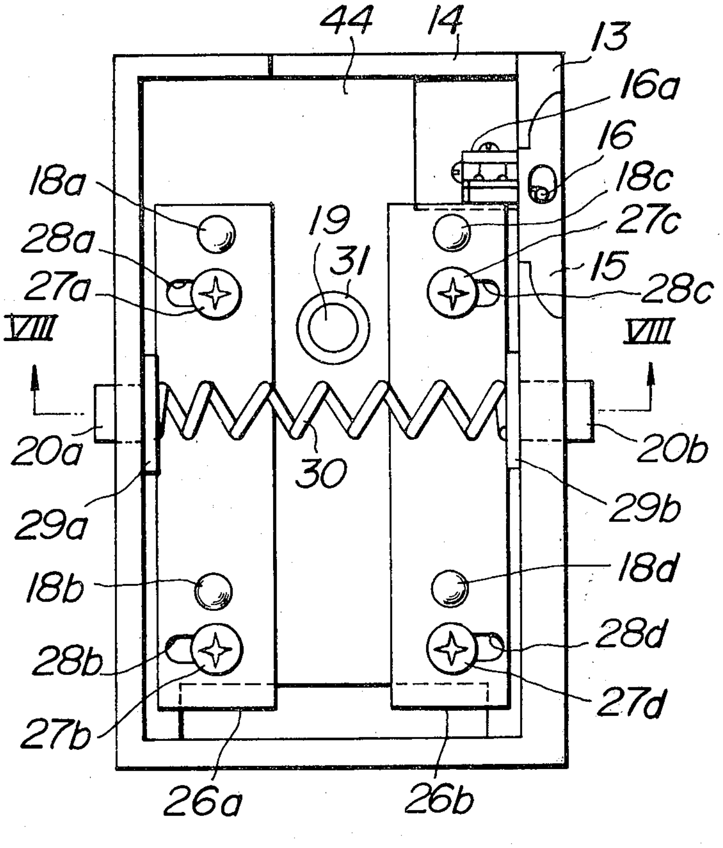
Figure 8:
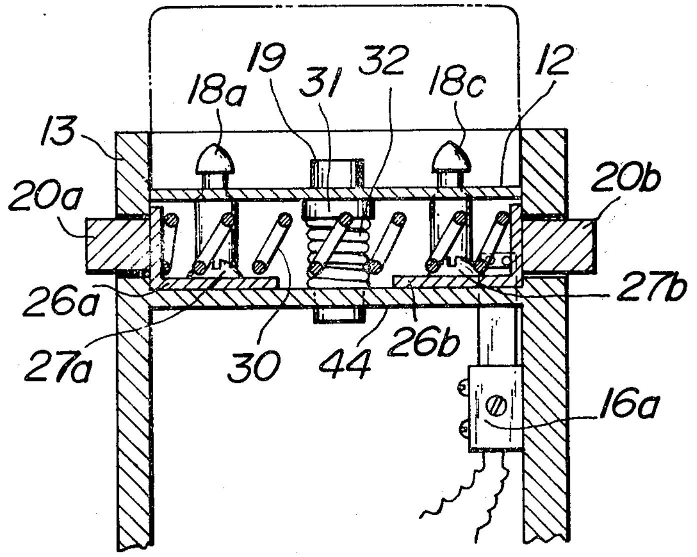
Figure 9:
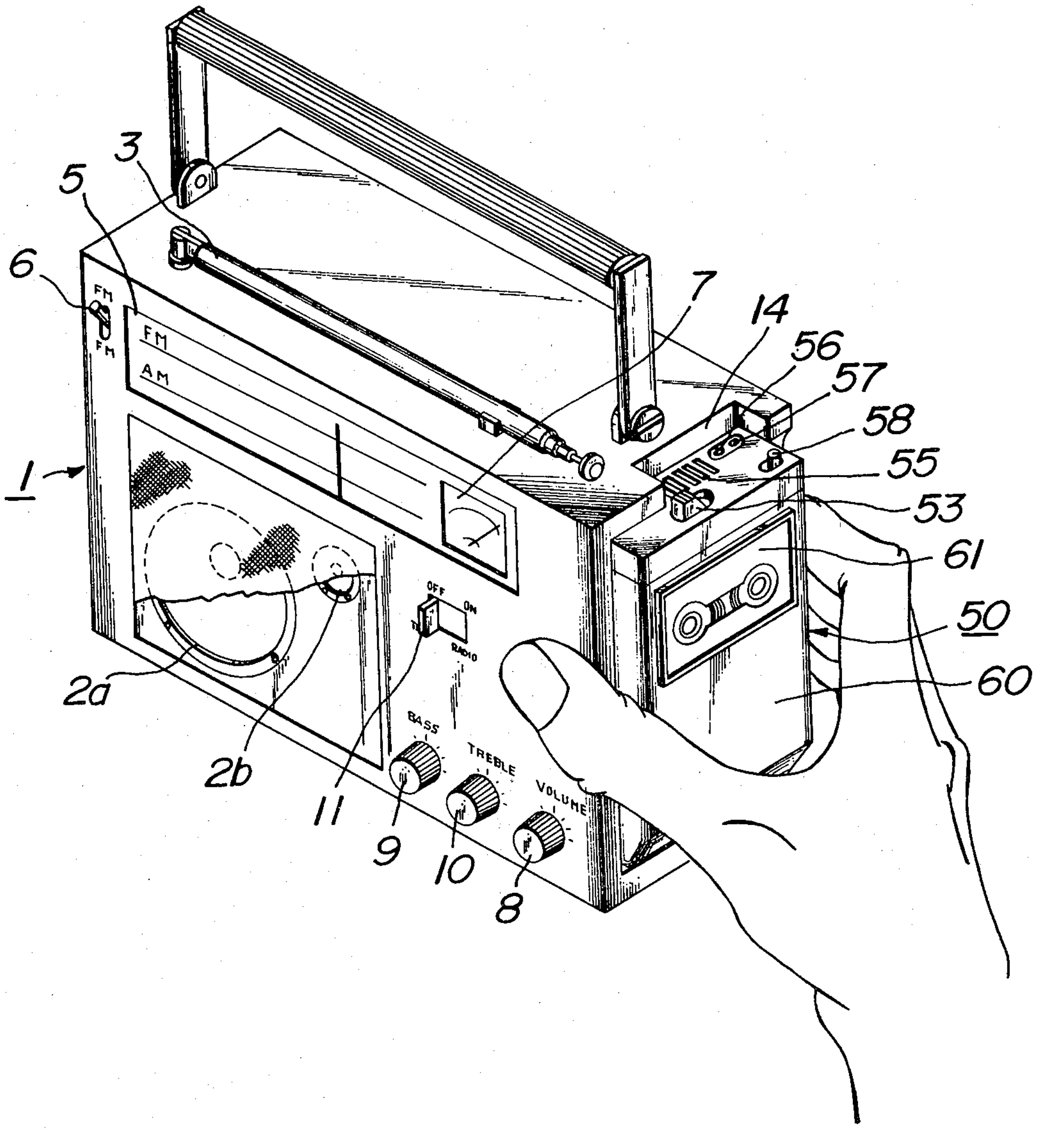
Figure 10:
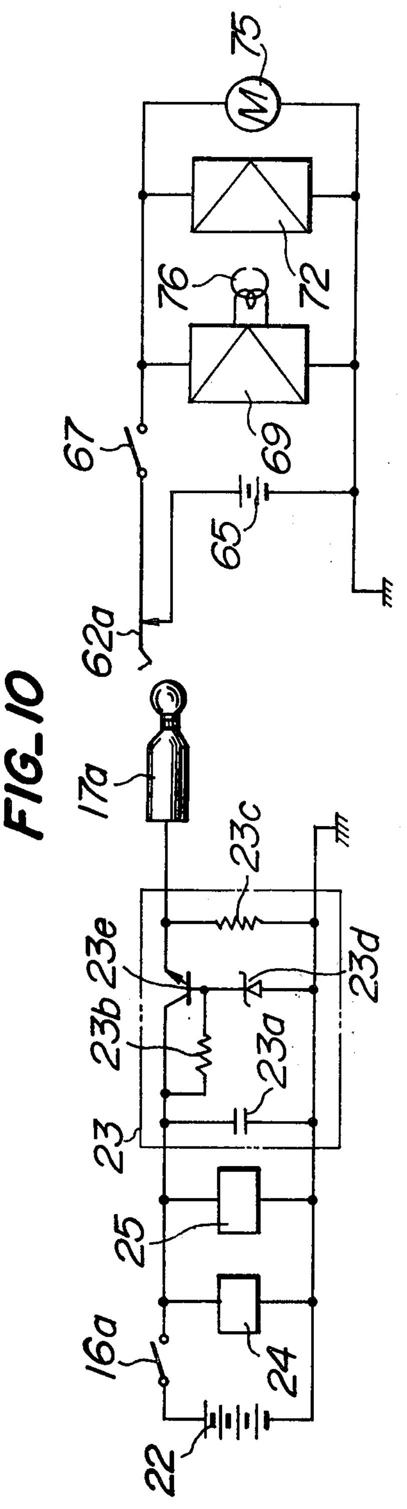
Figures 11, 12:
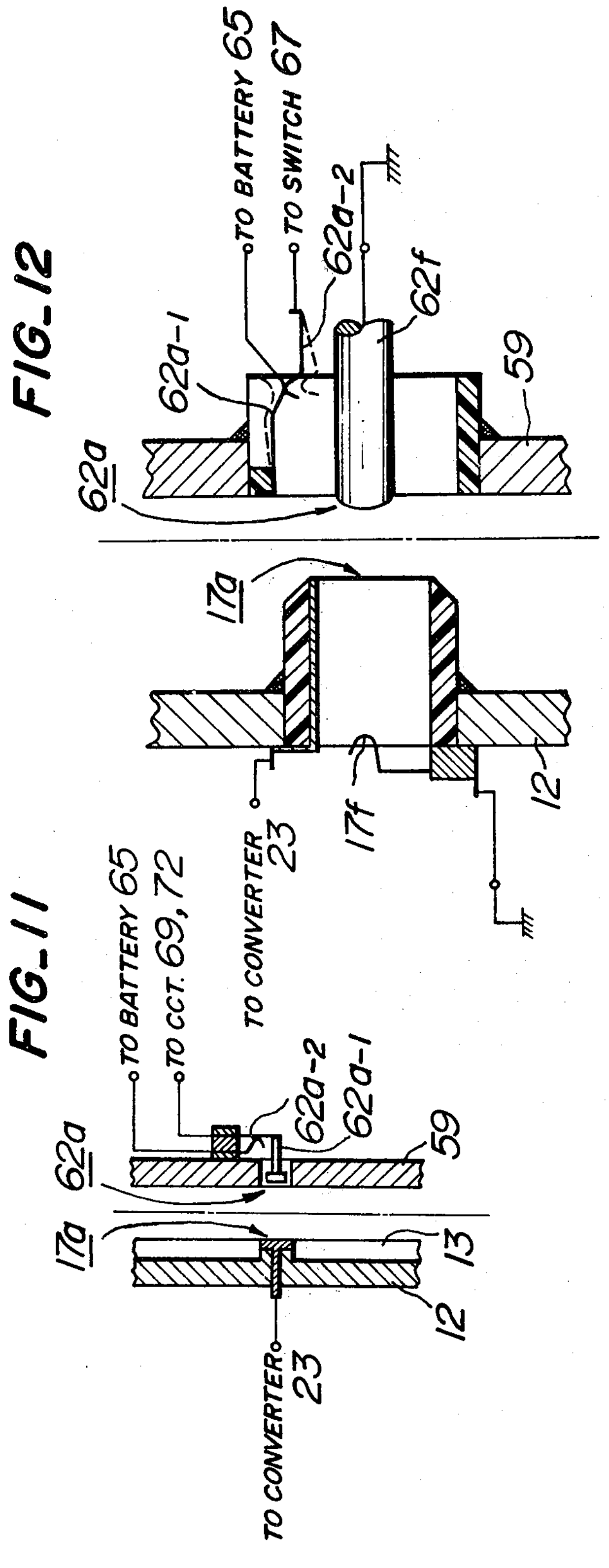
Figure 13:
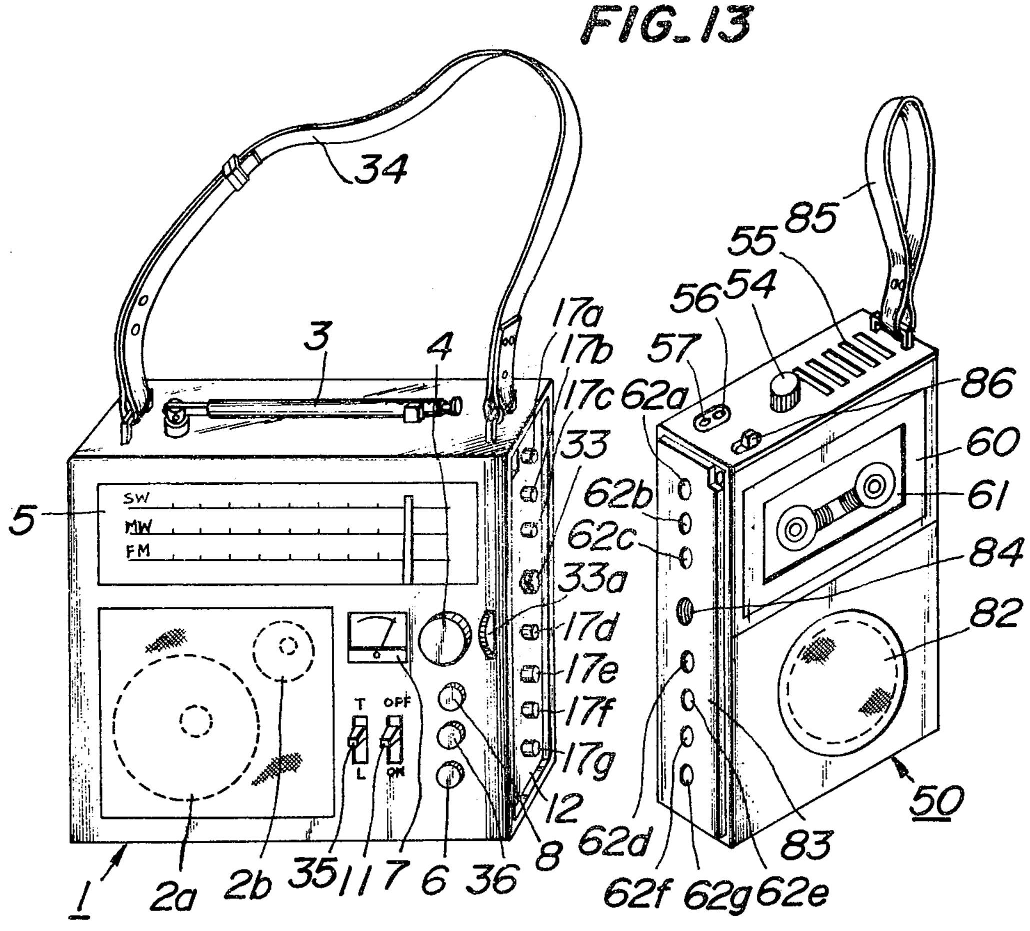
Figure 14:
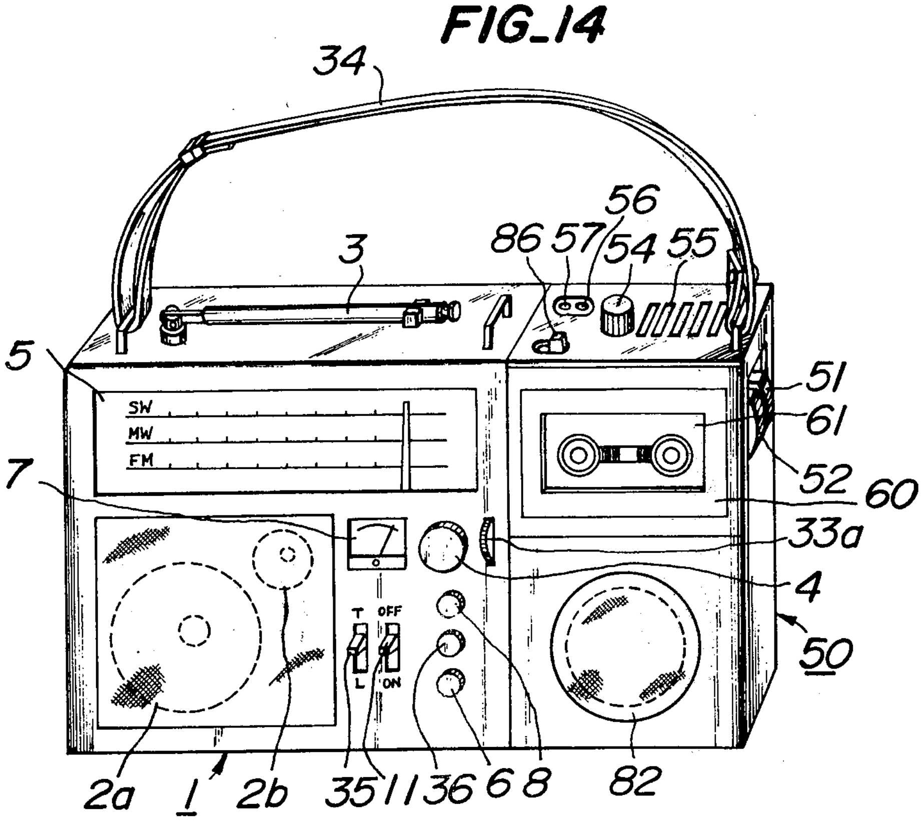
Figure 15:
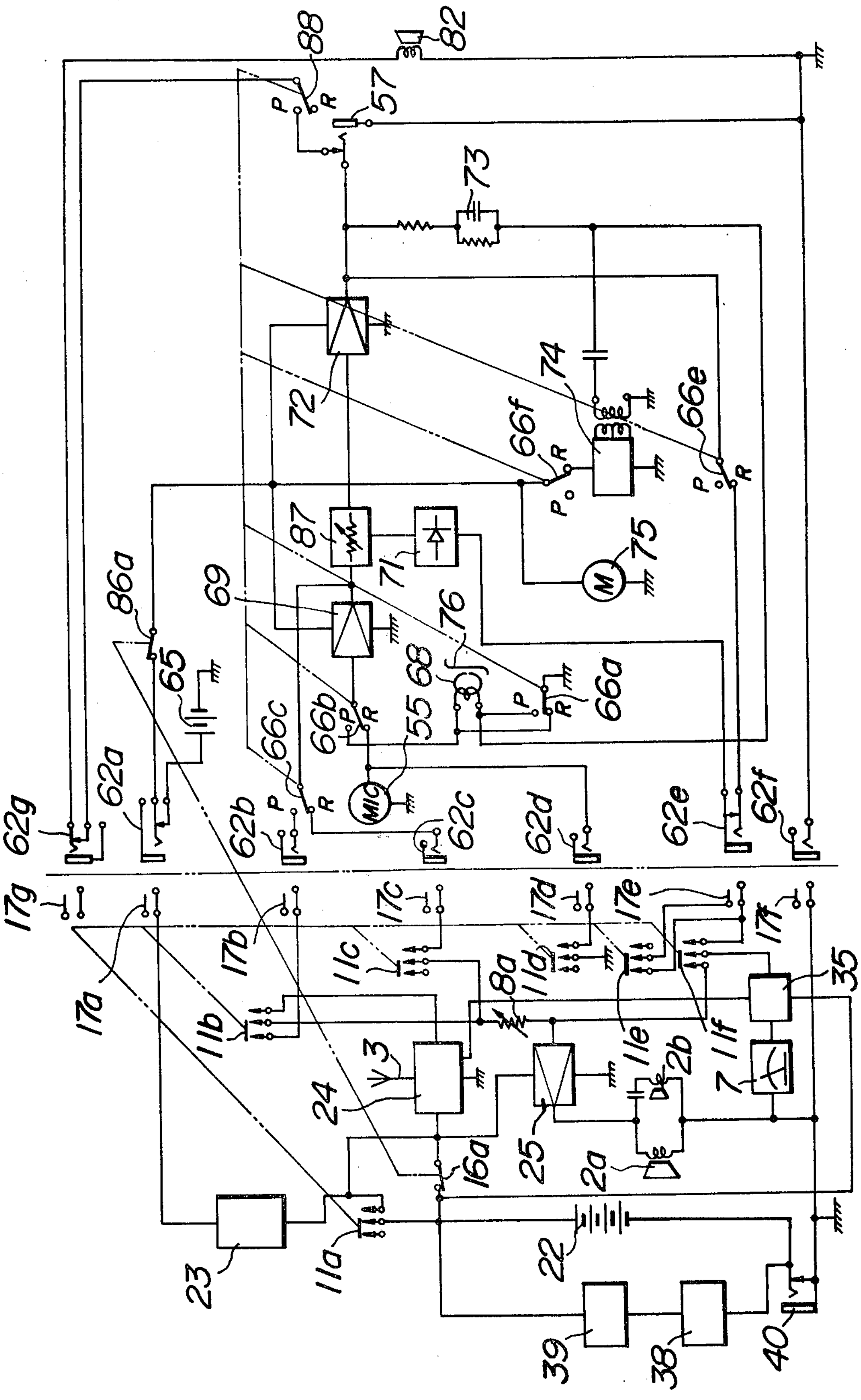
Figure 16:
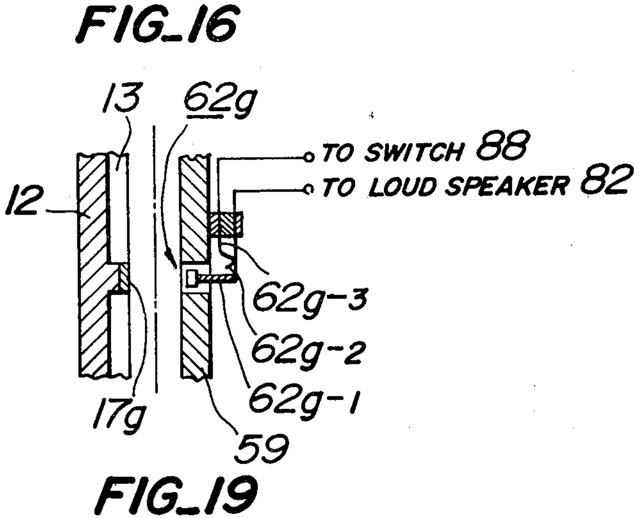
Figure 19:
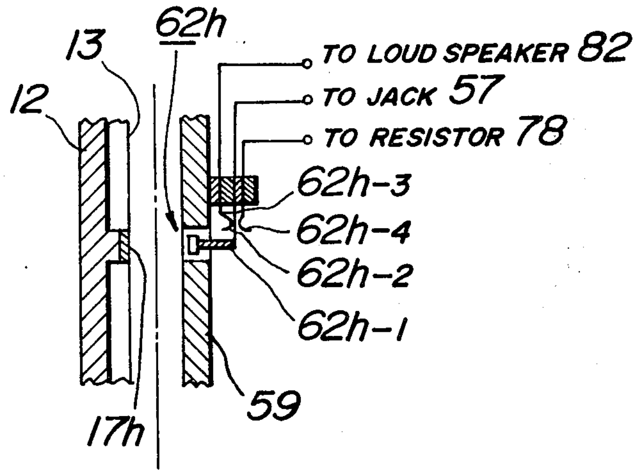
Figure 17:
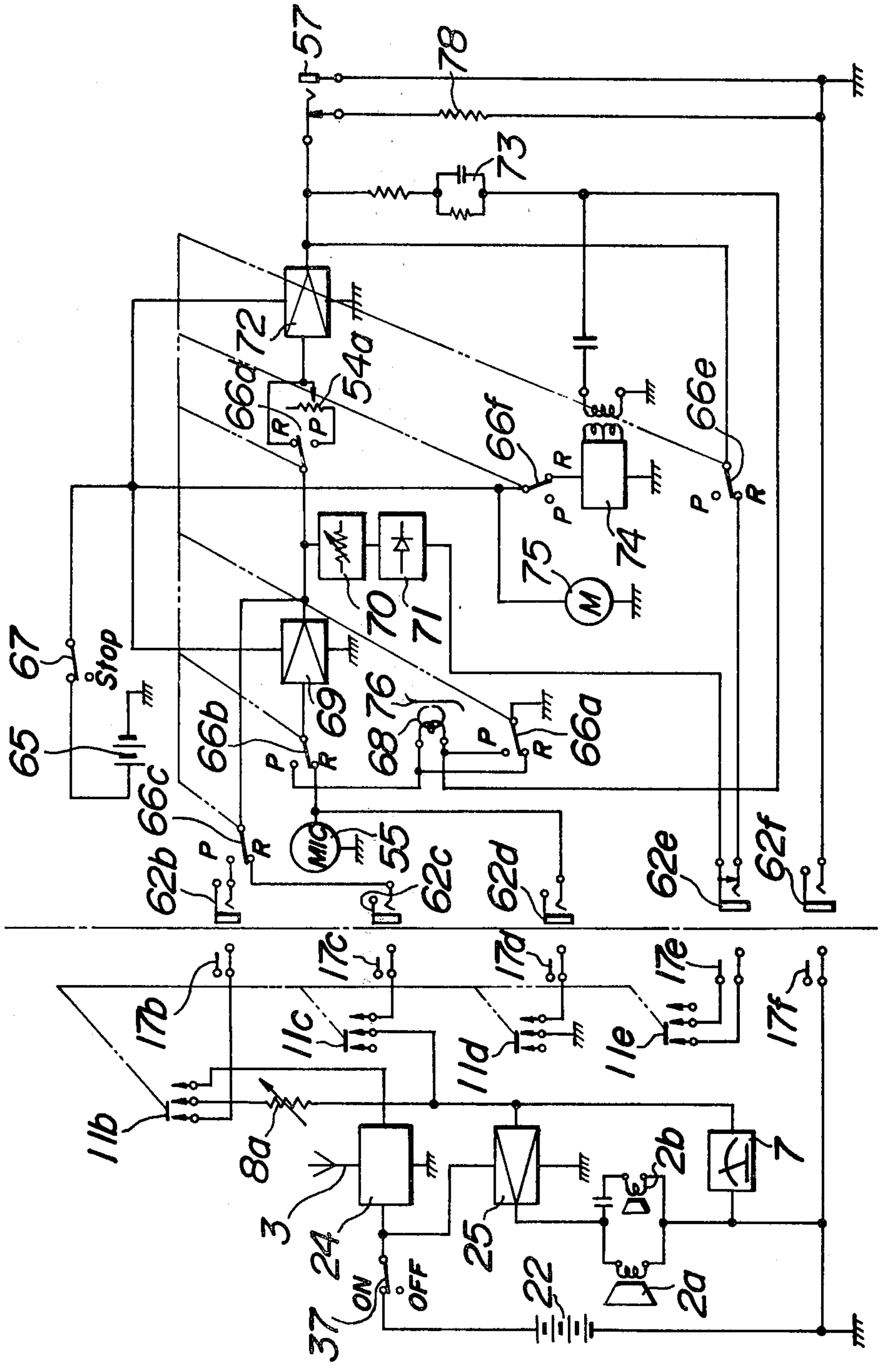
Figure 18:
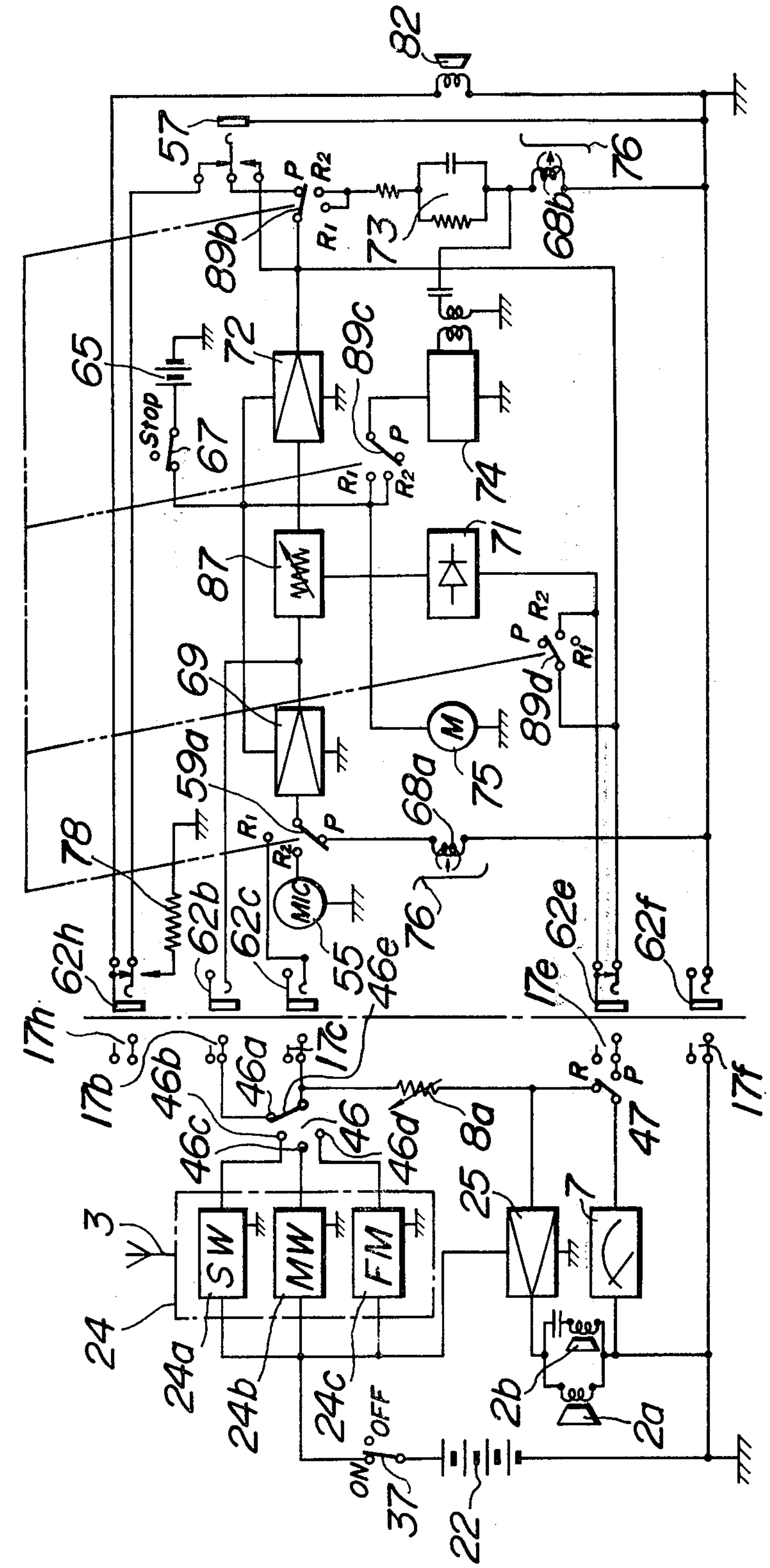
Figure 20:
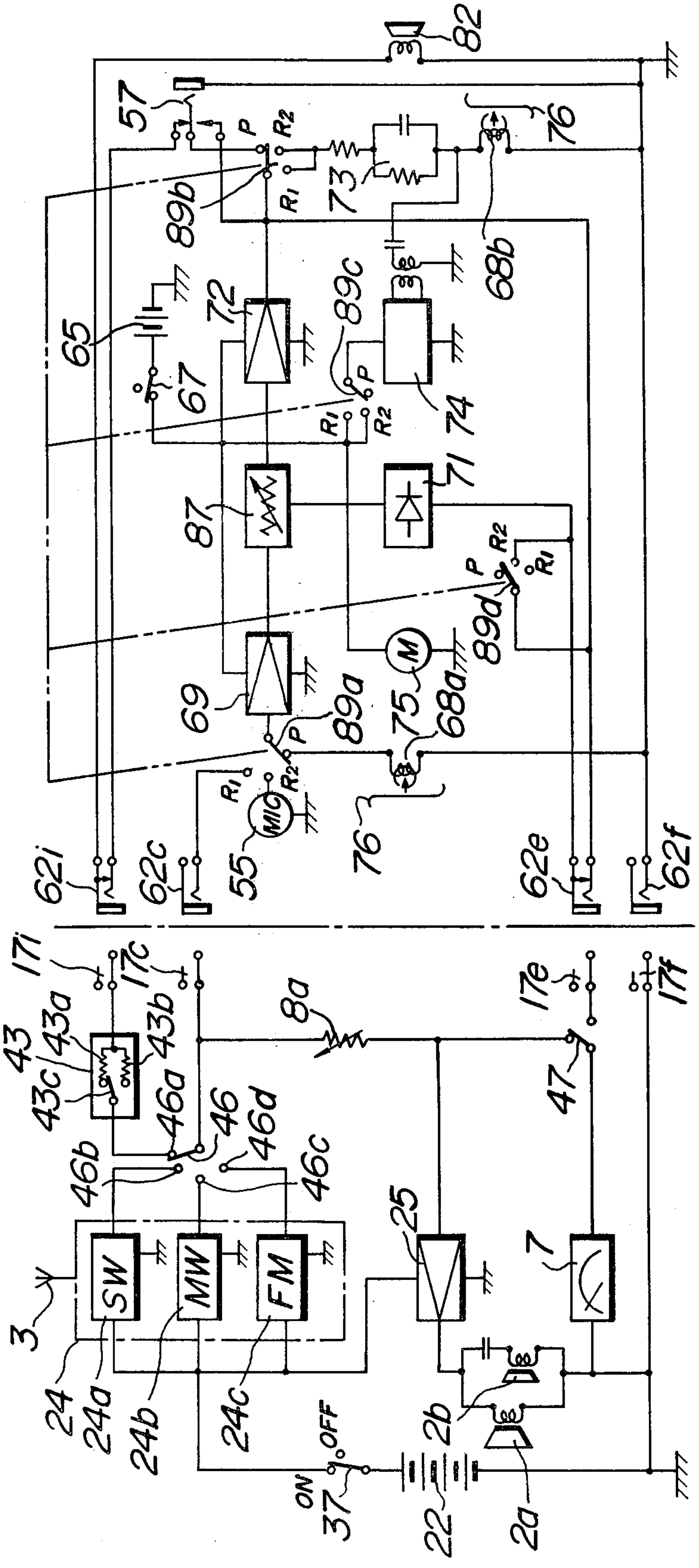

FIG. 5 is a cross sectional view taken along a line V—V in FIG. 2 showing the co-operation of the radio portion and the tape recorder portion, FIG. 6 is a sectional view taken along a line VI—VI in FIG. 5, FIG. 7 is a side view of the radio portion with its side wall being removed for illustrating a coupling mechanism, FIG. 8 is a cross sectional view taken along a line VIII—VIII in FIG. 7, FIG. 9 is a perspective view depicting the manner of decomposing the tape recorder portion from the radio portion, FIG. 10 is a circuit diagram showing an embodiment of a constant voltage converter provided in the radio portion, FIG. 11 is a cross sectional view illustrating an embodiment of a pin and jack for electrically connecting the radio and tape recorder portions, FIG. 12 is a cross sectional view showing another embodiment of the pin and jack, FIGS. 13 to 16 show a second embodiment of the audio apparatus according to the invention, FIG. 13 is a perspective view showing the radio and tape recorder portions in the separated from, FIG. 14 is also a perspective view illustrating them in the combined form, and FIG. 15 is a circuit diagram and FIG. 16 is a cross sectional view showing an embodiment of the pin and jack junction, FIG. 17 is a circuit diagram of a third embodiment of the audio apparatus according to the invention, FIG. 18 is a circuit diagram of a fourth embodiment of the audio apparatus according to the invention, FIG. 19 is a cross sectional view illustrating an embodiment of a pin-jack junction, and FIG. 20 is a circuit diagram of a fifth embodiment of the audio apparatus according to the invention.

Figure 1:
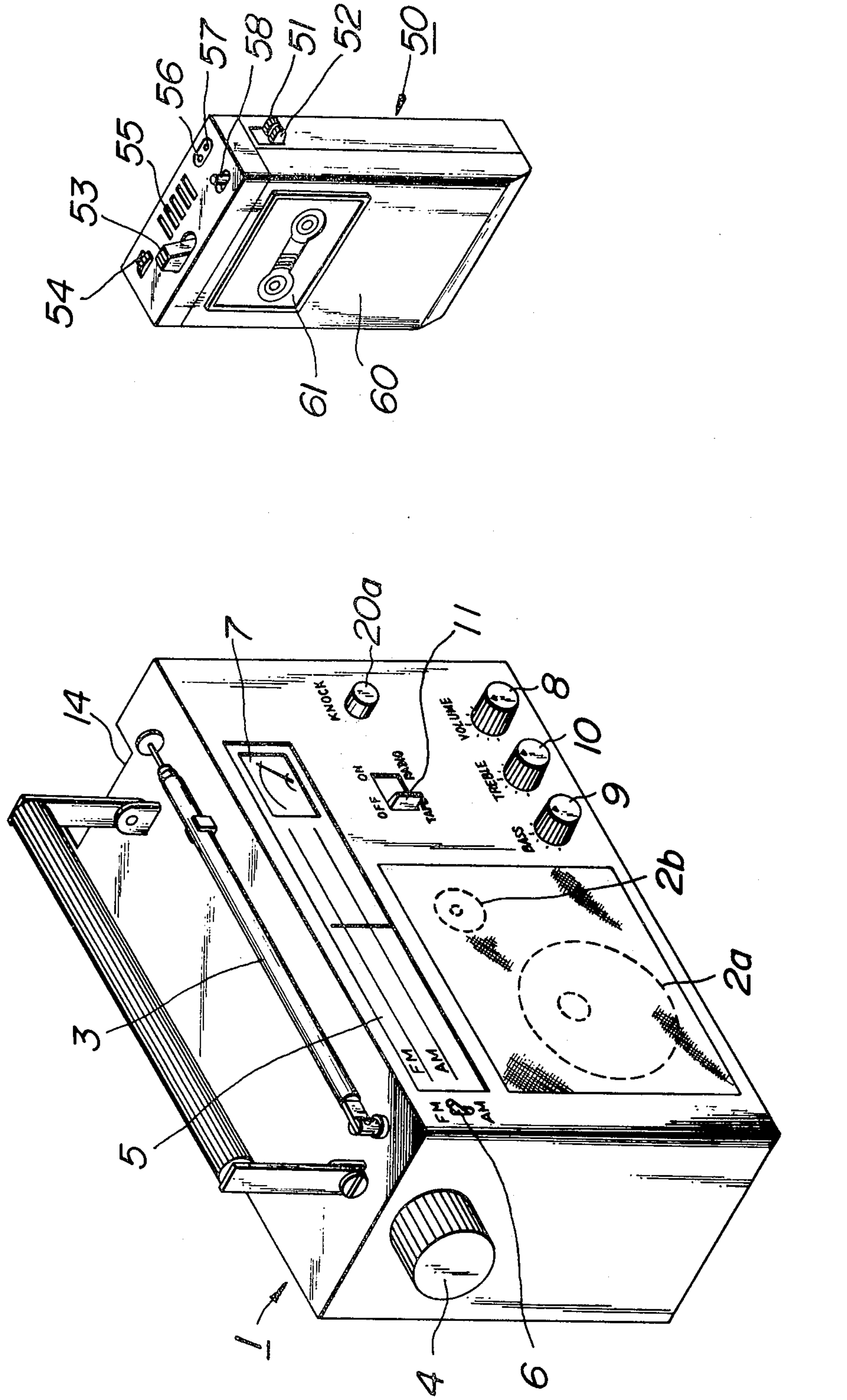

FIGS. 1 to 12 illustrates a first embodiment of the audio or acoustic apparatus according to the invention. As shown in FIGS. 1 and 2 the audio apparatus according to the invention comprises a radio receiving portion 1 which will be termed as a radio portion and a magnetically recording and reproducing portion 50 which will be referred as a tape recorder portion. The tape recorder portion 50 is of a type which uses a magnetic tape cassette. The applicant has developed a miniature tape recorder which can be handled by a user even in his single hand. In such a miniature tape recorder a miniature magnetic tape cassette referred as "micro cassette" is used instead of a compact cassette which has been widely used nowadays. Such a miniature cassette tape recorder is particularly preferable to be used as the tape recorder portion 50 of the audio apparatus of the present embodiment.

Figure 3:
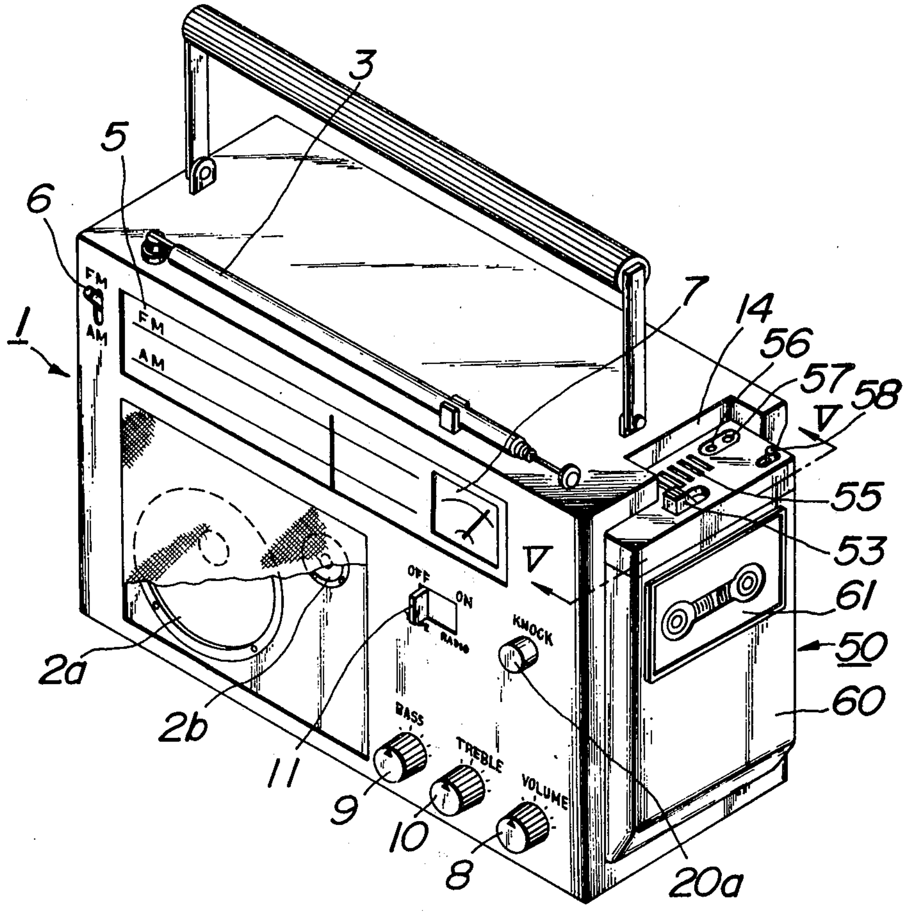
FIG. 3 is a perspective view of the audio apparatus in the combined form.

FIGS. 1 and 2 show the radio portion 1 and the tape recorder portion 50 in the separated or decomposed condition and FIG. 3 illustrates them in the combined condition.

The radio portion 1 has a housing of a rectangular shape which may be formed of a mold of resin. The radio portion 1 comprises on its front panel a hi-fi loudspeaker system, i.e. a main loudspeaker 2*a* having a diaphragm of a large diameter for a low and middle frequency range and a tweeter 2*b* having a diaphragm of a small diameter for a treble frequency range. The radio portion 1 further comprises a telescopic antenna 3 on its top roof, a tuning dial 4 on a side wall. On the front panel there are further provided AM/FM frequency calibration scales 5, an AM/FM selection switch 6, a level meter 7, a volume control dial 8, a bass tone control dial 9, a treble tone control dial 10 and a power and mode selection switch knob 11.

The tape recorder portion 50 is of a substantially flat rectangular shape. On a side wall of the tape recorder portion 50 there are provided a play-back knob 51 and a recording knob 52. On a top wall there are arranged a first-forward/CUE and rewind/REVIEW knob 53, a volume control dial 54, a built-in microphone 55, a pair of jacks 56 and 57 to which a remote microphone and an earphone may be connected, respectively, and a pause switch 58. On the front side of the tape recorder portion 50 there is provided a slidable lid 60. This lid 60 may be slid downwards to first and second positions successively. When the lid 60 is slid to the first position one can insert or take away a cassette into or from the tape recorder portion 50 and when the lid 60 is further slid to the second position one can exchange a battery. The lid 60 is provided with a window 61 through which one can see the cassette installed in the tape recorder portion 50.

In the present embodiment the play-back and recording knobs 51 and 52 are arranged to be slidable together in a longitudinal direction and the knob 52 is further slidable in the transverse direction of th tape recorder portion 50. When both of the knobs 51 and 52 are slid together upwardly in the longitudinal direction, the play-back operation is effected. When the knob 52 is first slid in the transverse direction towards the knob 51 and then the knobs 51 and 52 are slid together upwardly, the recording operation is carried out. The knob 53 has two functions. When the knob 53 is slid, the first-forward operation is effected and when the knob 53 is depressed, the rewind operation is achieved. When the knob 53 is slid or depressed during the play-back operation, the CUE or REVIEW operation is effected.

As shown in FIG. 3, a right hand side wall 12 of the radio portion 1 and the rear wall 59 of the tape recorder portion 50 are mechanically and electrically connected to each other. For this purpose on a circumferential edge of the right hand side wall 12 of the radio portion 1 there is formed a flange 13. An area surrounded by the flange 13 corresponds substantially to that of the rear wall 59 of the tape recorder portion 50 and the hight of the flange 13 is substantially equal to a half of the thickness of the tape recorder portion 50. Therefore the tape recorder portion 50 can be coupled to the side wall of the radio portion 1 in such a manner that the tape recorder portion 50 is substantially clamped by the flange 13.

In order to operate the tape recorder portion 50 in the combined mode of operation, the flange 13 is provided with cut-out portions 14 and 15. The portion 14 corresponds to the knob 53, the built-in microphone 55, the jacks 56, 57 and the pause switch 59 and the other cut-out portion 15 corresponds to the knobs 51 and 52. These cut-out portions ensure the necessary handling of the knobs and switch of the tape recorder portion 50 and further prevent air vibrations to be recorded through the microphone 55 from being hidden by the flange 13.

On the side wall 12 there are provided six electrically connecting pins 17*a*, 17*b*, 17*c*, 17*d*, 17*e* and 17*f*, four mechanically locking pins 18*a*, 18*b*, 18*c* and 18*d* and a button 19 for pushing the tape recorder portion 50 out of the side wall of the radio portion 1. These pins have such lengths that they do not extend beyond the flange 13. Therefore these pins are protected against the mechanical damage by the flange 13. On the rear wall 59 of the tape recorder portion 50 there are provided six electically connecting jacks 62*a*, 62*b*, 62*c*, 62*d*, 62*e* and 62*f* and four mechanically locking holes 63*a*, 63*b*, 63*c* and 63*d*. When the tape recorder portion 50 is coupled to the radio portion 1, the pins 17*a* to 17*f* are inserted into the jacks 62*a* to 62*f*, respectively so as to establish an electrical connections between the radio portion 1 and the tape recorder portion 50. At the same time the pins 18*a* to 18*d* are inserted into the holes 63*a* to 63*d* so as to ensure the mechanical locking between the radio and tape recorder portions 1 to 50. The construction and operation of the locking mechanism will be explained in detail hereinlater.

As explained above the cut-out portion 15 corresponds to the operating knobs 51 and 52 of the tape recorder portion 50, so that these knobs can be operated without being inhibited by the flange 13 of the radio portion 1. Moreover a movable contact 16 of a power switch 16*a* (see FIG. 4) of the radio portion 1 is extended in the cut-out portion 15 so as to be operated by the operating knob 51. In this case in the combined condition one can actuated the power switch 16a (see FIG. 4) of the radio portion 1 only by operating the knob 51 of the tape recorder portion 50.

In the combined mode of operation the volume control dial 54 of the tape recorder portion 50 is hidden by the top portion of the flange 13 of the radio portion 1 so that one could not operate the volume control dial 54. This is convenient for a user, because in the combined mode of operation the sounds are reproduced by the loudspeakers 2*a* and 2*b* of the radio portion 1 and its volume can be adjusted by the volume control dial 8 of the radio portion 1, so that the loudness of the sounds reproduced by the loudspeakers 2*a* and 2*b* need not be influenced by the setting of the volume control dial 54 of the tape recorder portion 50. As will be apparent hereinlater during the mic-recording the recording level is auatomatically adjusted by an AGC circuit.

Figure 4:
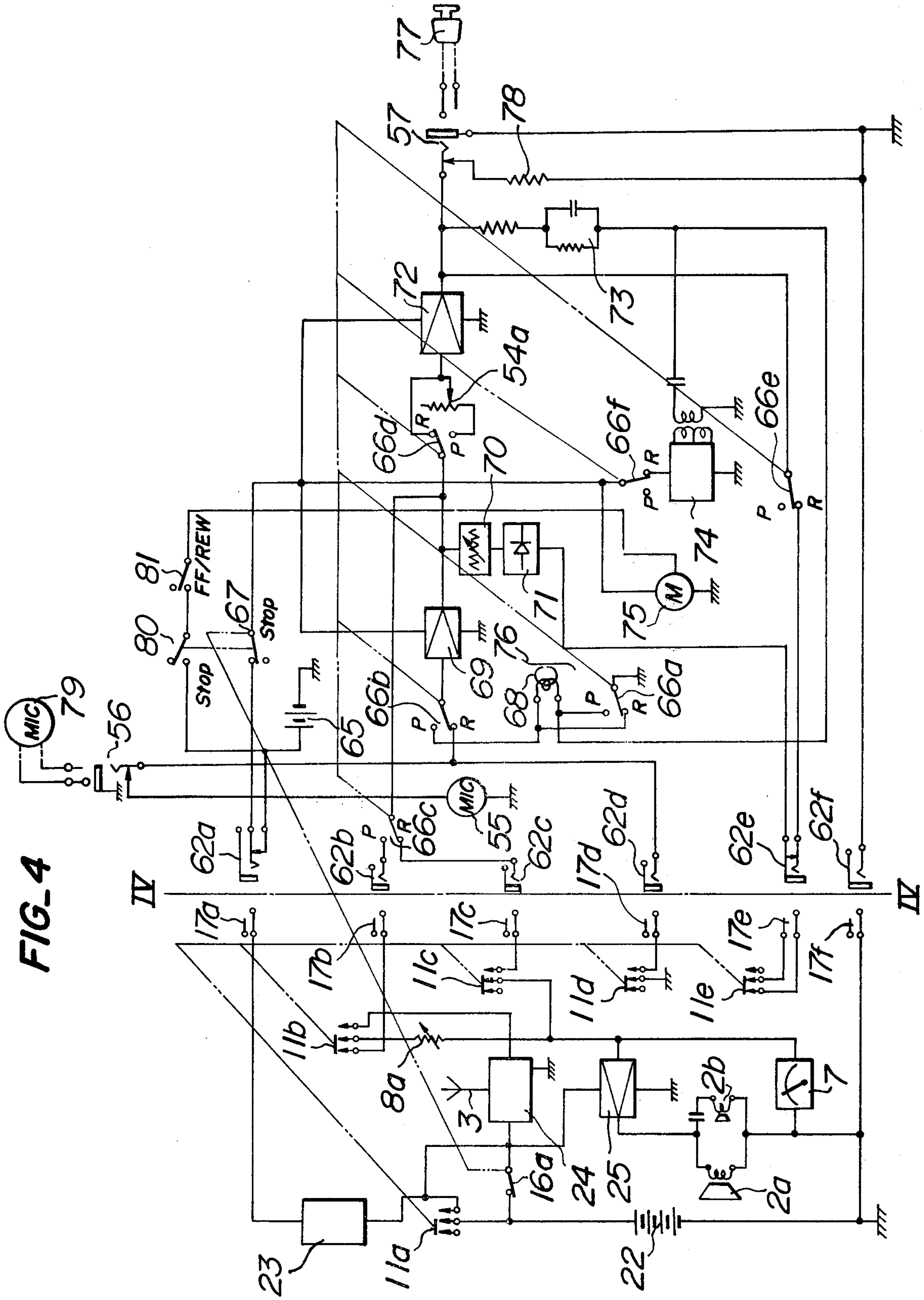
FIG. 4 is a circuit diagram of the audio apparatus of this embodiment.

FIG. 4 is a circuit diagram of the audio apparatus of the present embodiment. The left hand portion with respect to a chain line IV—IV is the radio portion 1 and the right hand portion is the tape recorder portion 50. The radio portion 1 comprises a voltage source battery 22 having a relatively large capacity, a constant voltage converter 23 for supplying a lower constant voltage suitable for energizing the tape recorder portion 50, a tuning circuit 24, an amplifying circuit 25. The power and mode selection switch knob 11 actuates simultaneously five switches 11*a*, 11*b*, 11*c*, 11*d* and 11*e*. The switch 11*a* serves as the power switch and the remaining switches 11*b* to 11*e* serve as the mode selection switches. The negative terminal of the battery 22 is connected to the earth and the positive terminal of the battery 22 is connected to a middle terminal of the switch 11*a*, a right hand terminal of which is connected to an input of the constant voltage converter 23, the tuning circuit 24 and the amplifying circuit 25. The output of the voltage converter 23 is connected to the pin 17*a*. Between the middle and right hand terminals of the switch 11*a* is connected the power switch 16*a* which is actuated by the movable lever 16 provided in the cut-out portion 15 of the flange 13. An output of the tuning circuit 24 is connected to a right hand terminal of the switch 11*b*. The middle terminal of this switch 11*b* is connected through a variable impedance element 8*a* for volume control which is actuated by the volume control dial 8 provided on the front panel to an input of the amplifying circuit 25 and to the level meter 7. The output of the amplifying circuit 25 is connected to the loudspeakers 2*a* and 2*b*. The left hand terminal of the switch 11*b* is connected to the pin 17*b*. The junction of the variable impedance element 8*a* and the amplifying circuit 25 is connected to the middle terminal of the switch 11*c* and the right hand terminal of the switch 11*c* is connected to the pin 17*c*.

The pin 17*d* is connected to the right hand terminal of the switch 11*d* and the middle terminal of this switch is connected to the earth. The pin 17*f* is connected to the earth. In practice each of the pins 17*a* to 17*f* has a pair of terminals. One of paired terminals of each of the pins 17*a*, 17*b*, 17*c*, 17*d* and 17*f* is floating, but two terminals of the pin 17*e* are connected to the left hand and middle terminals of the switch 11*e*, respectively.

The tape recorder portion 50 comprises a voltage source battery 65 a potential of which is lower than that of the battery 22 provided in the radio portion 1 and is equal to the output potential of the voltage converter 23. The tape recorder portion 50 further comprises six switches 66*a*, 66*b*, 66*c*, 66*d*, 66*e* and 66*f* which are simultaneously actuated by the operating knobs 51 and 52. That is to say when the knobs 51 and 52 are slid to the play-back position, the arms of these switches 66*a* to 66*f* are connected to terminals denoted by P and when the knobs 51 and 52 are actuated to the recording position, the arms of these switches 66*a* to 66*f* are connected to terminals denoted by R. The tape recorder portion 50 further comprises a switch 67 which is opened during the stop condition of the tape recorder portion 50, but is closed when either one of the knobs 51, 52 and 53 is acutated. The tape recorder portion 50 further comprises a recording and reproducing magnetic head 68, a pre-amplifier 69, an AGC circuit including a variable impedance element 70 and a rectifying element 71, an output or main amplifier 72, an equalizer circuit 73 represented by RC elements, a bias oscillator 74 and a driving motor 75.

The pins 17*a* to 17*f* provided on the side wall 12 of the radio portion 1 and the jack 62*a* to 62*f* provided on the rear wall 59 of the tape recorder portion 50 cooperate with each other in the following manner.

The pin 17*a* and the jack 62*a* serve to apply the power from the radio portion 1 to the tape recorder portion 50. The pin 17*c* and the jack 62*c* cooperate to transmit the output signal from the tuning circuit 24 of the radio portion 1 to the recording circuit of the tape recorder portion 50. The pin 17*b* and the jack 62*b* work to transmit the output signal from the pre-amplifier 69 of the tape recorder portion 50 to the amplifying circuit 25 of the radio portion 1. The pin 17*d* and the jack 62*d* co-operate to connect the built-in microphone 65 or the remote microphone to the earth. The pin 17*e* and the jack 62*e* operate to close or open the AGC circuit of the tape recorder portion 50. The pin 17*f* and the jack 62*f* co-operate to establish the common earth.

Next the connection and relation of the circuit elements mentioned above will be explained in detail.

Radio Portion 1

When the radio portion 1 is used as a single radio receiver, since the tape recorder portion 50 is not coupled to the radio portion 1 so that the switch 16*a* is opened, the battery 22 does not supply the electrical power to the tuning circuit 24 and the amplifying circuit 25 as long as the knob 11 is in the OFF state, i.e. sliding levers of the switches 11*a* to 11*e* are in the left hand positions. When the knob 11 is slid to "ON" position and the sliding levers of the switches 11*a* to 11*e* are moved to the right hand positions, the tuning and amplifying circuits 24 and 25 are energized by the voltage source 22. Then the output signal from the tuning circuit 24 is supplied through the switch 11*b* and the variable impedance element 8*a* to the amplifying circuit 25. The amplified signal from the circuit 25 is reproduced by the loudspeakers 2*a* and 2*b*. The input signal to the amplifying circuit 25 is also supplied to the level meter 7 so that the level of the reproduced signal is indicated. In the manner mentioned above the radio portion 1 may be used as an ordinary radio receiver in the separated mode of operation.

Tape Recorder Portion 50

In the separated mode the tape recorder portion 50 may be used as an ordinary cassette tape recorder. To this end the battery 65 supplies its electrical power through the jack 62*a* and the switch 67 to the preamplifier 69, the output amplifier 72, the bias oscillator 74 and the motor 75. Of course when the tape recorder portion 50 is in the rest or stop condition, the switch 67 is opened so that none of the above components is energized. Moreover the jack 62*a* possesses a switching function to replace the tape recorder portion battery 65 by the radio portion battery 22 in the combined mode of operation, which will be explained more in detail hereinlater.

The magnetic head 68 can be selectively used as the play-back magnetic head and the recording magnetic head by means of the switch 66*a*. The head 68 and the microphone 55 can be selectively connected to the input of the pre-amplifier 69 by means of the switch 66*b*. The switch 66c is connected between the output of the pre-amplifier 69 and the jacks 62*b* and 62*c*. When the switch 66*c* is in the play-back position P, the output signal from the pre-amplifier 69 is supplied to the output jack 62*b*, whilst when the switch 66*c* is actuated to the recording position R, the signal received by the radio portion 1 may be supplied to the input of the output amplifier 69. The switch 66*d* is connected between the output of the pre-amplifier 69 and the input of the output amplifier 72. When this switch is in the play-back position P, the variable impedance element 54*a* for the volume control is connected into the circuit, but when the switch is in the recording position R, the variable impedance element 54*a* is short-circuited so that this element 54*a* does not cause any influence on the signal level to be recorded.

The output signal from the output amplifier 72 is supplied to the known AGC circuit comprising the variable impedance element 70 and the rectifying element 71 through the switch 66*e* and the jack 62*e* having a switching function. When the pin 17*e* of the radio portion 1 is inserted into the jack 62*e*, the pin 17*e* open the contacts connected to the AGC circuit, but when the switch 11e is in the position shown in FIG. 4, the AGC circuit is closed again.

The output signal from the output amplifier 72 is also supplied to the equalizer circuit 73 consisting of RC elements. The predetermined frequency characteristic is added to the signal to be recorded by means of the equalizer circuit 72. On this signal is further superposed a bias current supplied from the bias oscillator 74 which operates only in the recording operation under the control of the switch 66*f* and the resultant signal is supplied to the head 68 which serves as the recording head in this case. An erasing head which operates only the recording operation is not shown in the drawing.

The output signal from the output amplifier 72 is further supplied to the earphone jack 57. Thus one can monitor the signal to be recorded in the recording operation and can also hear the sound reproduced by the head 68 during the play-back operation. The above mentioned AGC circuit, the equalizer circuit and the earphone circuit are all connected in parallel to the output amplifier 72.

When the tape recorder portion 50 is used as a single unit in the separated mode of operation, the battery 65 energizes the whole circuit portions. Next the operation of the tape recorder portion in such situation will be explained in detail.

Recording

Air vibrations to be recorded such as voice are converted by the built-in microphone 55 into an electrical signal. This signal is amplified by the pre-amplifier 69 to a given level. The output signal from the preamplifier is further amplified by the output amplifier 72 and the amplified signal is supplied to the equalizer circuit 73. The bias current is further added to the output signal from the equalizer circuit 73 and the resultant signal is supplied to the magnetic head 68 and is recorded on a tape 76 provided in the cassette. The output signal from the output amplifier 72 is supplied through the switch 66*e* which is closed during the recording operation and the jack 62*e* which has a switch function to the rectifying element 71 and the variable impedance element 70. These variable impedance element 70 and the rectifying element 71 constitute the known AGC circuit which keeps the signal level during the recording constant. Thus during the recording operation the variable impedance element 54*a* of the volume control is made inoperative by means of the switch 66*d*.

In the recording operation the signal to be recorded can be monitored by an earphone 77 which is connected to the earphone jack 57. One terminal of this jack 57 is connected to the earth through a dummy resistor 78.

When the remote microphone 79 is connected to the remote microphone jack 56, the built-in microphone 55 is disconnected, so that the sounds entering into the remote microphone 79 may be recorded in the same manner as that mentioned just above.

Play-back

In the play-back operation all of the switches 66*a* to 66*e* are switched to the play-back position P by means of the operation knobs 51 and 52. The switch 67 is also closed. The information recorded on the tape 76 is picked-up by the magnetic head 68 which serves as the play-back head in this case and is converted into the electrical signal. The converted electrical signal is supplied through the switch 66*b* to the pre-amplifier 69. The output signal from the pre-amplifier 69 is adjusted by the volume control 54*a* and then is amplified by the output amplifier 72. The amplified signal may be reproduced by the earphone 77 connected to the earphone jack 57. If an external amplifier and a separate loudspeaker are connected to the earphone jack 57, the sounds can be reproduced by the loudspeaker, instead of the earphone 77.

As described above the tape recorder portion 50 of the audio apparatus according to the invention can be used as an ordinary tape recorder. In this case since tape recorder portion 50 is small and light, it is very convenient for the user to carry it with him.

Next the combined mode of operation of the radio portion 1 and the tape recorder portion 50 will be explained in detail. When the rear wall 59 of the tape recorder portion 50 is fit into the flange 13 formed on the side wall 12 of the radio portion 1 and is coupled to the side wall 12 of the radio portion 1, the pins 17*a* to 17*f* of the radio portion 1 are inserted into the jacks 62*a* to 62*f*, respectively of the tape recorder portion 50. When the pin 17*a* is inserted into the jack 62*a*, the plug of the pin 17*a* makes the switch contact of the jack 62*a* opened, so that the battery 65 of the tape recorder portion 50 is switched out of the circuit and the output of the voltage converter 23 is connected to the switch 67 through the pin 17*a* and the jack 62*a*. Therefore the amplifiers 69, 72, the oscillator 74 and the motor 75 are energized from the battery 22 of the radio portion 1. The switch 67 is closed when the tape recorder portion 50 is driven into operation and is opened only when the tape recorder portion is in the rest or stop condition.

When the pin 17*b* is inserted into the jack 62*b*, the output from the tape recorder portion 50 may be supplied to the radio portion 1 and when the pin 17*c* is connected to the jack 62*c*, the output signal from the radio portion 1 may be supplied to the tape recorder portion 50. That is to say in the combined mode of operation the electrical power and the signal may be exchanged between the radio portion 1 and the tape recorder portion 50. Next the operation will be explained in detail in case of the recording and play-back operations of the tape recorder portion 50.

1. Recording

It should be noted that the recording includes two cases, i.e. recording of the output signal from the tuning circuit 24 of the radio portion 1 and recording of the signal from the built-in microphone 55 or the remote microphone 79. Selection of these input signals is effected by the switches 11*a* to 11*e* of the radio portion 1.

a. recording of tunner output

The knob 11 provided on the front panel of the radio portion 1 is slid to the left hand position labeled as "ON" and "RADIO". Then the slide levers of the switches 11*a* to 11e are moved to the right hand positions. When the knobs 51 and 52 of the tape recorder portion 30 are moved to the recording position, the switches 66*a* to 66*e* are switched to the recording positions R and also the switch 67 is closed. In this case the radio program signal received by the antenna 3 and selected by the tuning circuit 24 is supplied to the pin 17*c* through the switch 11*b*, the variable impedance element 8*a* and the switch 11*c*. From the pin 17*c* the radio program signal is further supplied through the jack 62*c*, the switch 66*c* and the switch 66*d* to the input of the output amplifier 72. The amplified signal is recorded on the tape 76 by the head 68 in the manner which has been already explained.

During the above recording operation the switch included in the jack 62*e* is opened by the inserted plug of the pin 17*e* and moreover the slide lever of the switch 11*e* is moved to the right hand position and thus the AGC circuit is opened. In this case the recording level can adjusted by the variable impedance element 8*a*. This is rather preferable, because if the AGC circuit is still effective the music sounds having a wide dynamic range might be smoothed by the AGC circuit, so that the sound signals might be recorded with a condition which cannot be appreciated. In the present embodiment the recording level can be adjusted by manually adjusting the volume control dial 8 with monitoring the level meter 7 and thus the music sounds having a wide dynamic range can be recorded without being deteriorated.

In this recording operation the received radio program signal may be listened by the loudspeakers 2*a* and 2*b*, but since the microphone 55 or 79 is connected to the earth through the jack 62*d*, the pin 17*d* and the switch 11*d*, the sounds entered in the microphone 55 or 79 might not be mixed with the signal to be recorded.

b. recording of microphone output

When the knob 11 of the radio portion 1 is shifted to the left hand position shown as "OFF" and "TAPE", the slide levers of the switches 11*a* to 11*e* are moved to the left hand positions. In this case when th knobs 51 and 52 are driven into the recording position, the switch 16*a* is closed, so that the voltage converter 22, the tuning circuit 24 and the amplifying circuit 25 are all energized. Of course the tape recorder portion 50 is also energized when the switch 67 is closed. But the output signal from the tuning circuit 24 is supplied neither to the amplifying circuit 25 nor to the tape recorder portion 50. Whilst the slide lever of the switch 11*d* is moved to the left hand position, so that the output of the microphone 55 is not connected to the earth. Thus the output signal from the microphone 55 may be supplied to the input of the preamplifier 69. Since the slide lever of the switch 11*e* is also moved to the left hand position, the AGC circuit in the tape recorder portion 50 is made effective. Thus the gain of the output amplifier 72 is automatically controlled and the amplitude of the signals supplied to the head 68 is smoothed. In this manner the AGC circuit can always maintain the recording level at a suitable value during the live recording which requires a quite wide dynamic range.

During the recording with the microphone 55, the output signal from the pre-amplifier 69 is not transmitted to the radio portion 1, because the switch 66*e* is set to the recording position R and the slide lever of the switch 11c is moved to the left hand side. Therefore there is never occurred undesired howling effect. The signal to be recorded may be monitored by means of the earphone 77 connected to the jack 57.

2. Play-back

This play-back means a case in which the audio signal picked-up by the head 68 is reproduced by the loudspeakers 2*a* and 2*b* of the radio portion 1.

The knob 11 of the mode selection switch is set to the left hand position and thus the slide levers of the switches 11*a* to 11*e* are in the left hand positions like as in the case of recording. When the knobs 51 and 52 are moved to the play-back position, the switches 66*a* to 66*e* are all set to the play-back positions P and the switch 67 is closed. At the same time the switch 16*a* in the radio portion 1 is closed by means of the knob 51 of the tape recorder portion 50.

In this condition the information recorded on the tape 76 is picked-up by the magnetic head 68 which serves as the play-back head in this instance and is converted into the electrical signal. This electrical signal is supplied to the pre-amplifier 69 through the switch 66*b*. The output signal from the pre-amplifier 69 is supplied through the switch 66*c*, the jack 62*b*, the pin 17*b*, the switch 11*b* and the variable impedance element 8*a* to the amplifying circuit 25. The sound level reproduced by the loudspeakers 2*a* and 2b may be adjusted by the volume control dial 8 provided on the front panel of the radio portion 1 with monitoring the level meter 7. In this manner the sounds recorded on the tape 76 can be reproduced in the best condition by the radio portion 1 having the high-fidelity loudspeakers 2*a* and 2*b*. This play-back operation can be carried out only by setting the knobs 51 and 52 of the tape recorder portion 50 to the play-back position even though the knob 11 of the radio portion 1 is in the "OFF" position, because even if the slide lever of the switch 11*a* is in the left hand position, when the knob 51 is driven into the play-back position, the switch 16a is closed by means of the movable contact 16 arranged in the cut-out portion 15 of the flange 13.

3. Other operations of tape recorder portion

In the combined mode of operation, the CUE and REVIEW operations can be effected normally, because in these operations the knob 51 is always driven into the play-back position and thus the switch 16*a* of the radio portion 1 is always closed. However, in the fast-forward and rewind operations, the knob 31 is in the stop position, so that the switch 16*a* is made opened. Therefore the motor 75 could not be energized by the battery 22 of the radio portion 1. In order to be able to carry out the fast-forward and rewind operations even in the combined mode of operation, the positive terminal of the battery 65 of the tape recorder portion 50 is connected to the motor 75 through a series circuit of switches 80 and 81. The switch 80 is co-operated with the switch 67 and when the switch 67 is closed or opened, the switch 80 is opened or closed, respectively. The switch 81 is driven by the knob 53 and when the knob 53 is acutated, the switch 81 is closed.

FIGS. 5 and 6 are cross sectional views of the audio apparatus according to the invention in the combined form for showing the co-operation of the knob 51 of the tape recorder portion 50 and the movble contact 16 of the power switch 16*a* of the radio portion 1. FIG. 5 is a cross section taken along a line V—V of FIG. 2 and FIG. 6 is a cross section taken along a line VI—VI of FIG. 5. As shown in FIGS. 5 and 6 an elongated hole 41 is formed in the cut-out portion 15 of the flange 13. Through this elongated hole 41 is extended the movable lever 16. One end of the movable lever 16 is connected to a resilient lead 42 of the switch 16*a* which lead 42 is extended through a hole 45 provided in an inner side wall 44. When the knob 51 is slid to the operative position in the play-back or recording operation, the knob 51 engages with the lever 16 and they move together upward in the plane of FIG. 6, so that the lead 42 comes into contact with the other lead 43 of the switch 16*a* and thus this switch is closed. If the knob 51 is returned to the stop position, the lever 16 also returns to its original position by means of its resiliency and thus the switch 16*a* is made opened again.

FIGS. 7 and 8 illustrate the mechanical coupling means between the radio portion 1 and the tape recorder portion 50. FIG. 7 is a side elevation of the one side of the radio portion 1 with its side wall 12 being removed and FIG. 8 is a cross-sectional view taken along a line VIII—VIII of FIG. 7. As shown in FIG. 8 the connecting pins 18*a* to 18*d* have head portions which serve as can surfaces and neck portions a diameter of which is smaller than that of the head portions. The connecting pins 18*a* and 18*b* are mounted on a slide plate 26*a* and the connecting pins 18*c* and 18*d* are mounted on a slide plate 26*b*. These slide plates 26*a* and 26*b* are slidbly mounted on the inner wall 44 by means of pins 27*a* to 27*d* secured on the inner wall 44 and elongated holes 28*a* to 28*d* formed in the slide plates 26*a* and 26*b*. At the middle of the outer edges of the slide plates 26*a* and 26*b* there are formed raised portions 29*a* and 29*b* to which the knockout buttons 20*a* and 20*b* are secured respectively. Between these raised portions 29*a* and 29*b* is arranged a coil spring 30 and thus the slide plates 26*a* and 26*b* are biased to be separated from each other. The button 19 is arranged between the side wall 12 and the inner wall 44 and its top end is extended outwardly through a hole formed in the side wall 12. The other end of the button 19 is passed through a hole formed in the inner wall 44. Near the middle of the button 19 is secured a stoper 31 and between this stoper 31 and the inner wall 44 is arranged a coil spring 32 so that the button 19 is biased upwards in the plane of FIG. 8.

When the tape recorder portion 50 is to be coupled to the radio portion 1, one holds the tape recorder portion 50 in his single hand with its rear wall 59 being opposite to his palm and inserts the tape recorder portion 50 into a space surrounded by the side wall 12 and the flange 13 of the radio portion 1. During this insertion the flange 13 serves to guide the tape recorder portion 54 into a position. In this position the head portions of the connecting pins 18*a* to 18*d* locate in the corresponding holes 63*a* to 63*d*. Then the tape recorder portion 50 is further pushed towards the side wall 12 against the knock-out pin 19. In this operation the head portions serve as cam surfaces and the slide plates 26*a* and 26*b* to which the pins 18*a*, 18*b* and 18*c*, 18*d* are connected are forced to slide in such a directions that these plates 26*a* and 26*b* come close to each other. In this position, the head portions of the pins 18*a* to 18*d* are opposite to the holes 63*a* to 63*d* formed in the rear wall 59 of the tape recorder portion 50 and enter into the holes. Then the slide plates 26*a* and 26*b* return to their original positions by means of the action of the coil spring 30. In this position the neck portions of the pins 18*a* to 18*d* engage with the peripheries of the holes 63*a* to 63*d*, so that the tape recorder portion 50 is latched and could not be removed from the radio portion 1. In the manner mentioned above the tape recorder portion 50 is firmly coupled to the radio portion 1.

Next in order to remove the tape recorder portion 50 from the radio portion 1, one can hold the tape recorder portion 1 with his first phalmaxes of his fingers as shown in FIG. 9 and push the knock-out pins 20*a* and 20*b* with the thumb finger cushion and the index or middle finger cushion, respectively, against the coil spring 30. Then the slide plates 26*a* and 26*b* are displaced in such a direction that they come close to each other. After this displacement the latching is released and thus the coil spring 32 push the pin 19 outward so as to knock-out the tape recorder portion 50. In this manner the tape recorder portion 50 can be easily removed from the radio portion 1 with a single operaton of the user. In this case the tape recorder portion 50 knocked-out can be positively received by the hand of the user so that it is hardly damaged.

FIG. 10 is a circuit diagram showing an embodiment of the constant voltage converter 23 of the radio portion 1. As shown in the drawings the constant voltage converter 23 comprises a capacitor 23*a*, resistors 23*b* and 23*c*, a Zener diode 23*d* and a transistor 23*e*. The converter 23 converts the voltage of for example 6V of the battery 22 in the radio portion 1 into a voltage of for example 3V which is equal to that of the battery 65 in the tape recorder portion 50. When the pin 17*a* of the radio porton 1 is inserted in the jack 62*a* of the tape recorder portion 50, contacts 62*a*–1 and 62*a*–2 are opened by means of a head portion of the pin 17*a* and the connection between the pin 17*a* and the contact 62*a*–1 is made, so that the amplifiers 69, 72, the motor 75, etc. are energized by the battery 22 of the radio portion 1 through the voltage converter 23.

FIG. 11 is a cross sectional view of an embodiment of the pin 17*d* and the jack 62*a*.

If the pin 17*a* is formed as a hollow cylindrical shape and a pin provided at the jack 62*a* is inserted in the center hole, such a junction may be used as two terminals. FIG. 12 illustrates an embodiment of such a junction. In FIG. 12, earth terminals are shown by references 17*f* and 62*f*.

FIGS. 13 to 16 show a second embodiment of the audio apparatus according to the invention. In this embodiment the same portions as those of the first embodiment are denoted by the same reference numerals. For the sake of simplicity only different points will be explained hereinafter.

In this embodiment the areas of one sides of the radio and tape recorder portions 1 and 50 are formed to be substantially equal to each other and input and output terminals are provided on these side walls. The tape recorder portion 50 comprises a loudspeaker 82. In the combined mode of operation the loudspeaker 82 of the tape recorder portion is made inoperative. To this end a pin 17*g* is provided on the side wall 12 of the radio portion 1 and a corresponding jack 62*f* is provided on the side wall 83 of the tape recorder portion 50. In the present embodiment the mechanical coupling means is consisted of a bolt 33 rotatably arranged on the side wall 12 of the radio portion 1 and a threaded hole 84 provided on the side wall 83 of the tape recorder portion 50. ON the bolt 33 there is secured a dial 33*a* a portion of which is exposed through a hole formed in the front panel of the radio portion 1. On the circumferential surface of the dial 33*a* are formed many slots and thus the user can easily rotate the dial 33*a* by his finger. On the top surface of the housing of the radio portion 1 there is arranged a carrying belt 34 a length of which may be adjusted at will. On the top surface of the housing of the tape recorder portion 50 there is provided a hand strap 85. In the combined form shown in FIG. 14, one end of the belt 34 is removed from the radio portion 1 and connected to the tape recorder portion 50. In the present embodiment the level meter 7 is also used also as a tuning meter and a battery checking meter. For this purpose there is arranged near the meter 7 a switch 35 for selecting the mode of the meter 7. When the switch 35 is operated in a position labeled as "TUNING", the meter 7 operates as the tuning meter and when the switch 35 is switched in a position denoted as "REC/BATT", the meter 7 operates as the level meter in the recording operation and also the battery checker. The radio portion 1 comprises a single tone control dial 36.

In the tape recorder portion 50 of this embodiment the lid 60 having the window 61 is hinged to the front surface and on the side wall there are arranged the playback and recording knobs 51 and 52. On the top surface there are arranged the fast-forward and rewind knob 53, the volume control dial 54, the built-in microphone 55 and the earphone jack 57. On the top surface there is further provided a power switch 86. As shown by a dotted line in FIG. 15, this power switch 86 is made co-operative with the power switch 16*a* in the radio portion 1 through suitable mechanical links.

As shown in FIG. 15, the construction of the radio portion 1 is substantially the same as the first embodiment and only a position of the variable impedance element 8*a* of the volume control differ from the previous embodiment. That is to say in the present embodiment this element 8*a* is connected between the middle contact of the switch 11*c* and the input of the amplifying circuit 25. By means of such a construction the recording level can be adjusted by a variable impedance element 87 of the tape recorder portion 50 even in case of recording the radio program signals supplied from the radio portion 1. Thus during the recording the loudness of the sounds reproduced by the loudspeakers 2*a* and 2*b* can be varied without effecting the recording level so as to effect a variable monitoring operation.

The switch 11*e* of the radio portion 1 has a function for switching on or off the AGC circuit of the tape recorder portion 50 in the combined mode of operation. The switch 11f has a function for selecting input signals to the level meter 7. In the tape recorder portion 50 the variable impedance element 87 serves as that of the volume control and the AGC circuit. Further the earphone jack 57 has a switching function and when the tape recorder portion 50 is solely used in the separated form, one can listen the reproduced sounds by means of either the earphone or the loudspeaker 82. Between the earphone jack 57 and the loudspeaker 82 there are inserted a switch 88 and the jack 62*g* having a switching function. This switch 88 co-operates with the switches 66*a* to 66*f*, and is closed or opened in the playback operation or the recording operation, respectively. When the radio portion 1 and the tape recorder portion 50 are coupled to each other, the switch of the jack 62*g* is opened by the pin 17*g* and thus the loudspeaker 82 is disconnected from the circuit.

In the combined mode of operation when the knob 11 is slid to the TAPE position and the switches 11*a* to 11*f* are in the positions opposite to those shown in FIG. 15, the output signal from the tuning circuit 24 can be supplied to the tape recorder portion 50 by operating the tape recorder portion into the recording position. As already explained above the power switch 16*a* of the radio portion 1 is closed by actuating the power switch 86 of the tape recorder portion 50. In the above recording operation, the AGC circuit is made inoperative by the switch 11*e* and the output signal from the main amplifier 72 is supplied to the level meter 7 through the switch 11*f*. Therefore the recording level can be adjusted to an optimal level by means of the volume control 54 of the tape recorder portion 50 with monitoring the level meter 7. In this manner the recording can be effected with a high signal to noise ratio. In this case it should be noted that the microphone 55 is connected to the earth through the switch 11d.

When the knob 1 is slid to the tape position, the recording with the microphone 55 can be carried out. In this case the AGC circuit is formed so as to adjust automatically the recording level. In this position of the knob 11, when the tape recorder portion 50 is operated to the play-back mode, the output signal from the pre-amplifier 69 is supplied to the radio portion 1 and is reproduced by the loudspeakers 2*a* and 2*b* of the radio portion 1.

In the present embodiment the radio portion 1 further comprises a rectifying circuit 38, a voltage regulator 39 and an AC jack 40. The AC jack 40 has a switch function and when an AC plug is inserted into the jack 40, the battery 22 is disconnected from the circuit.

FIG. 16 is a cross sectional view of an embodiment of the pin 17g and the jack 62*g*. In the jack 62*g* there is inserted a pin 62*g*–1 one end of which is connected to a lead 62*g*–2. In the position shown in FIG. 16 the lead 62*g*–2 is contact with the other lead 62*g*–3, so that the loudspeaker 82 is connected in the circuit, but when the pin 17*g* is inserted into the jack 62*g* the pin 62*g*–1 is pushed by the inserted pin 17*g* so that the leads 62*g*–2 and 62*g*–3 are separated from each other.

FIG. 17 shows a circuit diagram of a third embodiment of the audio apparatus according to the invention. This embodiment is simpler than the previous embodiments. In the present embodiment even in the combined mode of peration the tape recorder portion 50 is energized by its own battery 65. Therefore the junction consisting of the pin 17*a* and the jack 62*a* in the previous embodiments is deleted. In connection therewith the voltage converter is not provided in the radio portion 1. Further the switch 11*a* in the radio portion 1 is not provided. The construction of the tape recorder portion 50 is rather similar to the first embodiment.

FIG. 18 is a circuit diagram for showing the construction of a fourth embodiment of the audio apparatus according to the invention. On the front panel of the radio portion 1 thereis provided a switch 46 for relating the input signals to the amplifying circuit 25. This switch 46 has four contacts 46*a* to 46*d* and a switching arm 46*e*. The contact 46*a* is connected to the pin 17*b*, the contacts 46*b*, 46*c* and 46*d* are connected a short wave portion 24*a*, a middle wave portion 24*b* and an FM portion 24*c* of the tuning circuit 24, respectively. The switching arm 46*e* is connected to the pin 17*c* and is further connected to the amplifying circuit 25 through the variable impedance element 8*a* of the volume control. In the radio portion 1 there is further provided a switch 47 for selecting the input signals to the level meter 7. When the switch 47 is in the position denoted by R, the input signal to the amplifying circuit 25 is applied to the level meter 7 and when the switch 47 is changed to the position represented by T, the output signal from the main amplifier 72 is supplied to the level meter 7 through the junction 17*e* and 62*e* in the combined mode of operation.

In the tape recorder portion 50 there are provided switches 89*a* to 89*d* which co-operate with each other. Each of these switches comprises three contacts denoted by $R_1$, $R_2$ and P and a switching arm. The tape recorder portion 50 of the present embodiment comprises a play-back magnetic head 68*a* and a recording magnetic head 68*b*. When the switching arm of the switch 89*b* is connected either to the positions $R_1$ and $R_2$ during the recording mode, the output signal from the main amplifier 72 is supplied to the recording head 68*b* and when the switching arm is connected to the position P, the output signal from the main amplifier 72 is supplied to the loudspeaker 82. Between the switch 89*b* and the loudspeaker 82 is inserted the earphone jack 57 having a switching function. When the earphone plug is inserted into the jack 57, the loudspeaker 82 is disconnected from the circuit. Between the earphone jack 57 and the loudspeaker 82 there is further connected a jack 62*h* having a double switching function. If the tape recorder portion 50 is coupled to the radio portion 1 and a pin 17*h* is inserted into the jack 62*h*, the loudspeaker 82 is disconnected from the circuit and the dummy resistor 78 is connected into the circuit. According to the invention in the combined mode of operation the loudspeaker 82 of the tape recorder portion 50 is made inoperative.

The switch 89*c* serves to de-energize the bias oscillator 74 during the play-back operation. The switch 89*d* serves to operate the AGC circuit only when the micrecording operation is effected. The switch 89*a* acts to select the input signals to the pre-amplifier 69.

FIG. 19 is a cross sectional view showing an embodiment of the junction of the pin 17*h* and the jack 62*h* having the double switching function. The jack 62*h* comprises a small pin 62*h*–1 and three contacts 62*h*–2 to 62*h*–4. One end of the pin 62*h*–1 is connected to the middle contact 62*h*–2. In the separated form shown in FIG. 19, the contacts 62*h*–2 and 62*h*–3 are connected to each other. When the radio and tape recorder portions 1 and 50 are coupled to each other, the small pin 62*h*–1 is pushed by the inserted pin 17*h*, so that the contact 62*h*–2 is disconnected from the contact 62*h*–3 and is connected to the contact 62*h*–4.

FIG. 20 is a circuit diagram showing the construction of a fifth embodiment of the audio apparatus according to the invention. This embodiment is quite similar to the previous fourth embodiment. In this embodiment the radio portion 1 comprises an impedance matching circuit 48 composed of resistors 48*a* and 48*b* of different values and a switch 48*c*. This impedance matching circuit 48 is connected between the contact 46*a* of the switch 46 and a pin 17*i*. The switch 48*c* is operated in accordance with the kind of the tape recorder portion 50 to be coupled. That is to say when the tape recorder portion 50 comprises the loudspeaker 82, the switch 48*c* is actuated in the position shown in FIG. 20, but when the tape recorder portion 50 does not include the loudspeaker and comprises only the earphone jack 57, the switch 48*c* is operated in a position opposite to that shown in FIG. 20.

It should be noted that the present invention is not limited to the above embodiments and many modifications are possible within the scope of the invention. For instance, in the first and second embodiments if the operating voltage of the tape recorder portion 50 is equal to the radio portion 1, the constant voltage converter 23 may be deleted. In the first embodiment the tape recorder portion 50 is coupled to the right hand side wall 12 of the radio portion, but the tape recorder portion may be connected the left hand side wall of the radio portion. In this case the operating knobs 51 and 52 can be seen from the front side, so that it is convenient for the user to handle these knobs. Various mechanical coupling means may be employed for detachably coupling the radio and tape recorder portions.

We claim:

1. An audio apparatus comprising a radio portion operable independently as a radio receiver and including a housing, a tuning circuit for selectively receiving a radio broadcasting program signal, an amplifying circuit connected to said tuning circuit for amplifying the received radio program signal supplied from the tuning circuit, a loudspeaker system connected to said amplifying circuit for acoustically reproducing the amplified signal supplied from said amplifying circuit, and an electrical power source connected to said tuning and amplifying circuits for energizing them;

a tape recorder portion operable independently as a magnetically recording and playback cassette tape recorder and including a housing, a magnetic tape cassette receiving portion, magnetic tape driving means for driving a magnetic tape installed in said cassette, recording and playback operating means, magnetically operating means having at least one magnetic head for recording and pick-up of an audio signal on and from said magnetic tape, respectively, an amplifying circuit for amplifying the audio signal to be recorded and the audio signal picked-up by said magnetically operating means, acoustically reproducing means connected to said amplifying circuit for acoustically reproducing the picked-up audio signal, and an electrical power source connected to said tape driving means and amplifying circuit for energizing them;

mechanical coupling means provided on surfaces of said housings of said radio and tape recorder portions for detachably coupling these portions at said surfaces; and first and second electrically coupling terminal means provided on said surfaces of the housings of the radio and tape recorder portions, respectively, said first and second electrically coupling terminal means being electrically connected to each other when said radio and tape recorder portions are mechanically coupled to each other at said surfaces, whereby in a combined mode of the radio and tape recorder portions said radio program signal can be supplied from said radio portion to said tape recorder portion through said first and second electrically coupling terminal means so as to record said radio program signal on said magnetic tape by means of said magnetically operating means and said audio signal picked-up by said magnetically operating means can be supplied from said tape recorder portion to said radio portion through said first and second electrically coupling terminal means so as to reproduce acoustically said picked-up audio signal by means of said loudspeaker system.

2. An audio apparatus according to claim 1, wherein one side wall of the radio portion and one side wall of the tape recorder portion are formed to be detachably coupled to each other and said side wall of the radio portion is provided with a flange at its periphery and said mechanical coupling means of the radio portion comprises a bolt one end of which is extended from the side wall, but do not extend beyond said flange and said mechanical coupling means of the tape recorder portion comprises a threaded hole into which said bolt is coupled in the combined mode.

3. An audio apparatus according to claim 1, wherein said tape recorder portion further comprises a microphone connected to ground potential through a switch closed when the combined radio and tape recorder portions are driven so that the radio program signal is recorded on the magnetic tape.

4. An audio apparatus according to claim 1, wherein said radio portion further comprises a power switch and said tape recorder portion further comprises a power switch, whereby in the combined mode of operation said power switch of the radio portion is actuated by operating said power switch of the tape recorder portion.

5. An audio apparatus according to claim 1, wherein said radio and tape recorder portions further comprise their own power switches, whereby these power switches can be operated separately.

6. An audio apparatus according to claim 1, wherein one side wall of said radio portion and a rear wall of the tape recorder portion are formed to be mechanically and electrically coupled to each other, said side wall of the radio portion comprises a flange formed in the periphery of said side wall the inner contour being substantially similar to that of the rear wall of the tape recorder portion, whereby in case of coupling the radio and tape recorder portions, the tape recorder portion is substantially clamped by said flange.

7. An audio apparatus according to claim 6, wherein said electrically coupling means of the radio portion comprises pins which are secured to the side wall of the radio portion, but do not extend beyond the flange, while the electrically coupling means of the tape recorder portion comprises jacks into which said pins are inserted in the combined mode of operation.

8. An audio apparatus according to claim 6, wherein said flange provided on the side wall of the radio portion includes a cut-out portion at such a position that in the combined mode the operating member of the tape recorder portion can be actuated through said cut-out portion of the flange.

9. An audio apparatus according to claim 6, wherein said tape recorder portion comprises a built-in microphone and said flange of the radio portion includes a cut-out portion at such a position that in the combined mode air vibrations to be recorded can enter into said built-in microphone through said cut-out portion of the flange.

10. An audio apparatus according to claim 6, wherein said mechanically coupling means of the radio portion comprises at least two coupling pins, each of which comprises a head portion having a cam surface and a neck portion having a smaller diameter than the head portion, these coupling pins being biased to be separated from each other in the direction of the width of the radio portion, while said rear wall of the tape recorder portion comprises at least two coupling holes into which said coupling pins are entered against said biasing force when the rear wall of the tape recorder portion is urged against the side wall of the radio portion.

11. An audio apparatus according to claim 10, wherein said radio portion further comprises knock-out means having knock-out buttons for displacing said coupling pins in such a manner that the coupling pins come close to each other so as to disengage the mechanical coupling between said neck portion and the coupling hole, while said knock-out means further comprises a knock-out pin which is biased outwardly in the direction normal to the side wall of the radio portion, whereby when said knock-out buttons are depressed in the combined condition, said rear wall of the tape recorder portion is pushed by means of said knock-out pin so as to remove said tape recorder portion from the radio portion.

12. An audio apparatus according to claim 1, wherein said tape recorder portion further comprises a loudspeaker system connected to the output of the amplifying circuit through a sixth terminal having a switching function and said radio portion further comprises a sixth terminal which co-operates with said sixth terminal of the tape recorder portion, whereby when the radio and tape recorder portions are coupled to each other, said switch connected to the loudspeaker of the tape recorder portion is made opened, so that the loudspeaker system of the tape recorder portion is made inoperative in the combined mode of operation.

13. An audio apparatus according to claim 12, wherein said tape recorder portion further comprises an earphone jack connected in parallel with said loudspeaker system and said six terminal of the tape recorder portion has a double switching function, whereby in the separated mode, only when the earphone is connected to said earphone jack, said loudspeaker system is made inoperative, but in the combined mode said loudspeaker system of the tape recorder portion is made always inoperative.

14. An audio apparatus according to claim 1, wherein said first electrically coupling terminal means on said surface of the housing of the radio portion comprises a first terminal connectable to the output of said tuning circuit of the radio portion and a second terminal which can be connected to the input of said amplifying circuit of the radio portion, said second electrically coupling terminal means on said surface of the housing of the tape recorder portion comprising a first terminal connectable to the input of said amplifying circuit of the tape recorder portion, said first terminal being electrically connected to said first terminal of said first electrically coupling terminal means of the radio portion, when said radio and tape recorder portion are coupled to each other, and a second terminal connectable to receive said audio signal picked-up by said magnetically operating means, said second terminal being connected to said second terminal of said first electrically coupling terminal means, when said radio and tape recorder portions are coupled to each other.

15. An audio apparatus according to claim 14, wherein said first electrically coupling terminal means of the radio portion further comprises a third terminal connectable to said power source of the radio portion and said electrically coupling means of the tape recorder portion further comprises a third terminal connectable to the power source of the tape recorder portion through a switch which is made opened when the radio and tape recorder portions are coupled to each other, said third terminal of the tape recorder portion being connected to said third terminal of the radio portion in the combined mode, whereby in the combined mode of operation the tape recorder portion is energized by the power source of the radio portion through said third terminals.

16. An audio apparatus according to claim 15, wherein said radio portion further comprises an A.C. power supply jack, a rectifier connected to said A.C. jack and a voltage regulator connected to said rectifier.

17. An audio apparatus according to claim 15, wherein said radio portion further comprises a power switch which is connected between said power source and the third terminal of the radio portion, said tape recorder portion comprising a driving member which cooperates with said operating means of the tape recorder portion so as to actuate said power switch of the radio portion in the combined mode.

18. An audio apparatus according to claim 17, wherein said radio portion further comprises a constant voltage converter which is connected between said power switch and said third terminal and converts the voltage value of the power source of the radio portion to a voltage value equal to that of the power source of the tape recorder portion.

19. An audio apparatus according to claim 17, wherein said tape recorder portion further comprises a power switch which is connected between said third terminal and the amplifying circuit, the driving means including a driving motor, etc. and is closed by actuating said recording and play-back operating means, first-forward and rewind operating means and an auxiliary power switch which is connected between the power source and the driving motor and is closed by actuating said fast-forward and rewind operating means, whereby in the combined mode of operation, the fast-forward and rewind operation is effected by energizing the driving motor with the power source of the tape recorder portion.

20. An audio apparatus according to claim 14, wherein said radio portion comprises a switching circuit including cooperating first and second switches having first and second switching positions, said first switch being connected between the input of the amplifying circuit and the first terminal of the radio portion and said second switch being connected among the output of the tuning circuit, the second terminal and the input of the amplifying circuit of the radio portion, whereby when said first and second switches are actuated to the first positions, the output signal from the tuning circuit is supplied to the input of the amplifying circuit through the second switch and the first terminal is connected to the input of the amplifying circuit through the first switch and the second terminal is disconnected from the input of the amplifying circuit, whilst when said first and second switches are actuated into the second positions, the output of the tuning circuit is supplied through the first and second switches to the first terminal and the amplifying circuit and the second terminal is connected through the second switch to the amplifying circuit.

21. An audio apparatus according to claim 20, wherein said radio portion further comprises a fourth terminal and said switching circuit further comprises a third switch which is connected between said fourth terminal and the ground potential and is co-operated with said first and second switches into said first and second positions, while said tape recorder portion further comprises a microphone and said electrically coupling means of the tape recorder portion further comprises a fourth terminal connected to said microphone and being able to be connected to said fourth terminal of said radio portion, whereby when said switching circuit is actuated into said first position in the combined mode of operation, said microphone is connected to the earth through said fourth terminals, but when said switching circuit is actuated into said second position, the microphone is disconnected from the earth potential.

22. An audio apparatus according to claim 21, wherein the tape recorder portion further comprises a remote microphone jack which is connected to said third terminal of the tape recorder portion.

23. An audio apparatus according to claim 20, wherein said radio portion further comprises a level meter connected to the input of the amplifying circuit, a variable impedance element connected in the circuit between said first and second switches, and a fifth terminal and said switching circuit further comprises a fourth switch which is connected to said fifth terminal and is co-operated with the other switches of the switching circuit, while said tape recorder portion further comprises an automatic gain control circuit for keeping the recording level constant and a fifth terminal which is connected in said automatic gain control circuit and is able to be connected to said fifth terminal of the radio portion in the combined mode of operation, whereby when said switching circuit is actuated into the first position in the combined mode, said automatic gain control circuit is made opened, so that the recording level may be adjusted by means of said variable impedance element with monitoring said level meter and when said switching circuit is actuated into the second position, said automatic gain control circuit is closed.

24. An audio apparatus according to claim 23, wherein said switching circuit further comprises a fifth switch which is connected to the input of the amplifying circuit, the fifth terminal and the level meter and is co-operated with the other switches of the switching circuit, whereby said switching circuit is actuated in the first position, the input of the amplifying circuit is connected through said fifth switch and when the switching circuit is actuated to the second position in the combined mode, the output signal from the amplifying circuit of the tape recorder portion is supplied to said level meter through said fifth terminals and said fifth switch.

25. An audio apparatus according to claim 23, wherein said radio portion further comprises a selection switch which is connected between the level meter and the power source, the tuning circuit and the input of the amplifying circuit, whereby said level meter is used as a battery checker, a tuning indicator as well as the level meter by operating said selection switch.

26. An audio apparatus according to claim 23, wherein said tape recorder portion comprises a variable impedance element for adjusting the reproduced signal level and an operating member for actuating said variable impedance element, sand said radio portion further comprises means for inhibiting the operation of said operating member in the combined mode of operation.

27. An audio apparatus according to claim 26, wherein said mechanically coupling means comprises a flange formed on the periphery of said surface of the radio portion and said means for inhibiting the operation of said operating member is formed by a part of said flange.

28. An audio apparatus according to claim 23, wherein said amplifying circuit of the tape recorder portion comprises a pre-amplifier and a main amplifier, said variable impedance element is connected between the pre-amplifier and the main amplifier and said first and second terminals of the tape recorder portion are connected to a circuit between the output of the pre-amplifier and the variable impedance element through a switch which has recording and play-back positions.

29. An audio apparatus according to claim 28, wherein said tape recorder portion further comprises an earphone jack connected to the output of said pre-amplifier, whereby the output signal from said pre-amplifier to be recorded or reproduced can be monitored by the earphone.

30. An audio apparatus according to claim 20, wherein said switching circuit of the radio portion comprises a switch having at least one contact connected to the output of said tuning circuit, a contact connected to said second terminal and a switching arm connected to said first terminal and the input of the amplifying circuit.

31. An audio apparatus according to claim 30, wherein said radio portion further comprises an impedance matching circuit including a switch and connected between said second terminal and the other contact of said switch, whereby any tape recorder portions of different type may be connected to the radio portion by operating said switch in the impedance matching circuit.

32. An audio apparatus according to claim 30, wherein said radio portion further comprises a variable impedance element connected between said switching arm and the input of the amplifying circuit, whereby in case of recording the radio program signals supplied from the tuning circuit, the recording level is adjusted by a variable impedance element provided in the radio portion.

33. An audio apparatus according to claim 32, wherein the second terminal of the tape recorder portion is connected to a circuit stage of the amplifying circuit, which stage is preceding to a variable impedance element of the tape recorder portion, whereby in the combined mode the sound level reproduced by the loudspeaker system of the radio portion is adjusted by the variable impedance element of the radio portion.

34. An audio apparatus according to claim 33, wherein said tape recorder portion further comprises an automatic gain control loop, a seventh terminal having a switching function and a switch which is closed only during the recording of the radio program signals, these seventh terminal and the switch being connected in parallel in said automatic gain control circuit, while said radio portion further comprises a switch, a level meter and a seventh terminal, said switch comprising a switching arm connected to said level meter, a first contact connected to the input of the amplifying circuit and a second contact connected to said seventh terminal, whereby when said radio and tape recorder portions are coupled to each other, said switch of the seventh terminal of the tape recorder portion is opened, but the automatic gain control circuit may be closed by closing said of the tape recorder portion.

* * * * *